United States Patent
Feng

(10) Patent No.: US 12,216,685 B2
(45) Date of Patent: *Feb. 4, 2025

(54) SYSTEMS AND METHODS FOR PATTERN-BASED MULTI-STAGE DETERMINISTIC DATA CLASSIFICATION

(71) Applicant: The Travelers Indemnity Company, Hartford, CT (US)

(72) Inventor: Zi Cheng Feng, Woodhaven, NY (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,744

(22) Filed: Dec. 22, 2023

(65) Prior Publication Data

US 2024/0126788 A1    Apr. 18, 2024

Related U.S. Application Data

(63) Continuation of application No. 17/721,705, filed on Apr. 15, 2022, now Pat. No. 11,893,045.

(51) Int. Cl.
  *G06F 16/00*  (2019.01)
  *G06F 16/28*  (2019.01)
  *G06V 30/19*  (2022.01)

(52) U.S. Cl.
  CPC .......... *G06F 16/285* (2019.01); *G06V 30/19* (2022.01)

(58) Field of Classification Search
  CPC ..................................... G06F 16/285
  USPC .......................................... 707/740
  See application file for complete search history.

(56) References Cited

U.S. PATENT DOCUMENTS

| | | | |
|---|---|---|---|
| 10,776,434 B1* | 9/2020 | Blackman | G06F 16/3344 707/707 |
| 2014/0330594 A1* | 11/2014 | Roberts | G06Q 40/08 705/4 |
| 2021/0012265 A1* | 1/2021 | Todorovic | G06Q 10/10 707/707 |
| 2022/0067828 A1* | 3/2022 | Gross | G06V 10/7784 707/707 |

OTHER PUBLICATIONS

Office Action for U.S. Appl. No. 17/721,705 dated Jun. 15, 2023; 8 pps.
Notice of Allowance for U.S. Appl. No. 17/721,705 dated Oct. 25, 2023; 8 pps.

* cited by examiner

*Primary Examiner* — Alexandria Y Bromell
(74) *Attorney, Agent, or Firm* — Rowan Tree Law Group, PLLC; Carson C. K. Fincham

(57) ABSTRACT

Systems and methods for pattern-based multi-stage deterministic data classification that may reduce processing and memory overhead while providing more accurate data classifications.

20 Claims, 11 Drawing Sheets

SYSTEMS AND METHODS FOR PATTERN-BASED MULTI-STAGE DETERMINISTIC DATA CLASSIFICATION

CROSS-REFERENCE TO RELATED APPLICATIONS

This disclosure claims benefit and priority under 35 U.S.C. § 120 to, and is a Continuation of, U.S. patent application Ser. No. 17/721,705 filed on Apr. 15, 2022 and titled "SYSTEMS AND METHODS FOR PATTERN-BASED MULTI-STAGE DETERMINISTIC DATA CLASSIFICATION", which issued as U.S. Pat. No. 11,893,045 on Feb. 6, 2024, which is hereby incorporated by reference herein in its entirety.

BACKGROUND

Automatic classification of data elements based on client or customer input (e.g., application submission data) has typically been accomplished by utilizing a mix of human judgment with data processing support. Classification can be a critical element in the processing of incoming data to ensure that resources are appropriately allocated to manage incoming requests. Errors in classification can cause significant delays and costs for both the data processing entity and the clients or customers thereof. Recent efforts to improve classification by leveraging automation to reduce the amount of human input/judgment required in the decision-making process have centered on utilization of Artificial Intelligence (AI).

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Introduction

While the use of AI has proven advantageous in many applications and for many different purposes in various industries, in some cases the use of AI may not be beneficial or may even be detrimental. Where input data sets are relatively predictable, for example, AI may be quite advantageous in solving problems. Certain data sets may also or alternatively be advantageously handled utilizing various stochastic processes, such as Machine Learning (ML) or stochastic AI procedures. In some cases, however, the advantages of AI and/or stochastic processing may not be realized. In the case that the data set is not predictable, for example, AI and/or stochastic processing may either fail to provide advantages or may fail to adequately solve a given problem. The inventor has realized that some client and/or customer input data sets are unpredictable, which creates a problem space that is both large and expanding. In such a case, AI and/or stochastic processing may be inefficient, expensive to implement, and/or may not produce desirable results.

In accordance with embodiments herein, these and other deficiencies of previous solutions are remedied by providing systems, apparatus, methods, and articles of manufacture for pattern-based multi-stage deterministic data classification. The inventor has realized, for example, that utilization of a deterministic, pattern-based data processing model structured specifically for an unpredictable data input set associated with customer (or potential customer) or client application data may provide more efficient, less costly, and more accurate problem set solutions. As described in more detail by the non-limiting examples set forth herein, according to some embodiments, values for data parameters necessary for data processing may be identified, but not immediately extracted. Embodiments herein, for example, may utilize data descriptive of the presence (or lack thereof) of data values to conduct classification analysis, without needing to expend the data and processing resources necessary to extract such values. Value extraction may then occur, for example, only after classification and/or only for input data sets that have been assigned to certain classifications (e.g., a subset of classifications).

II. Pattern-Based Multi-Stage Deterministic Data Classification Systems

Figure 1:
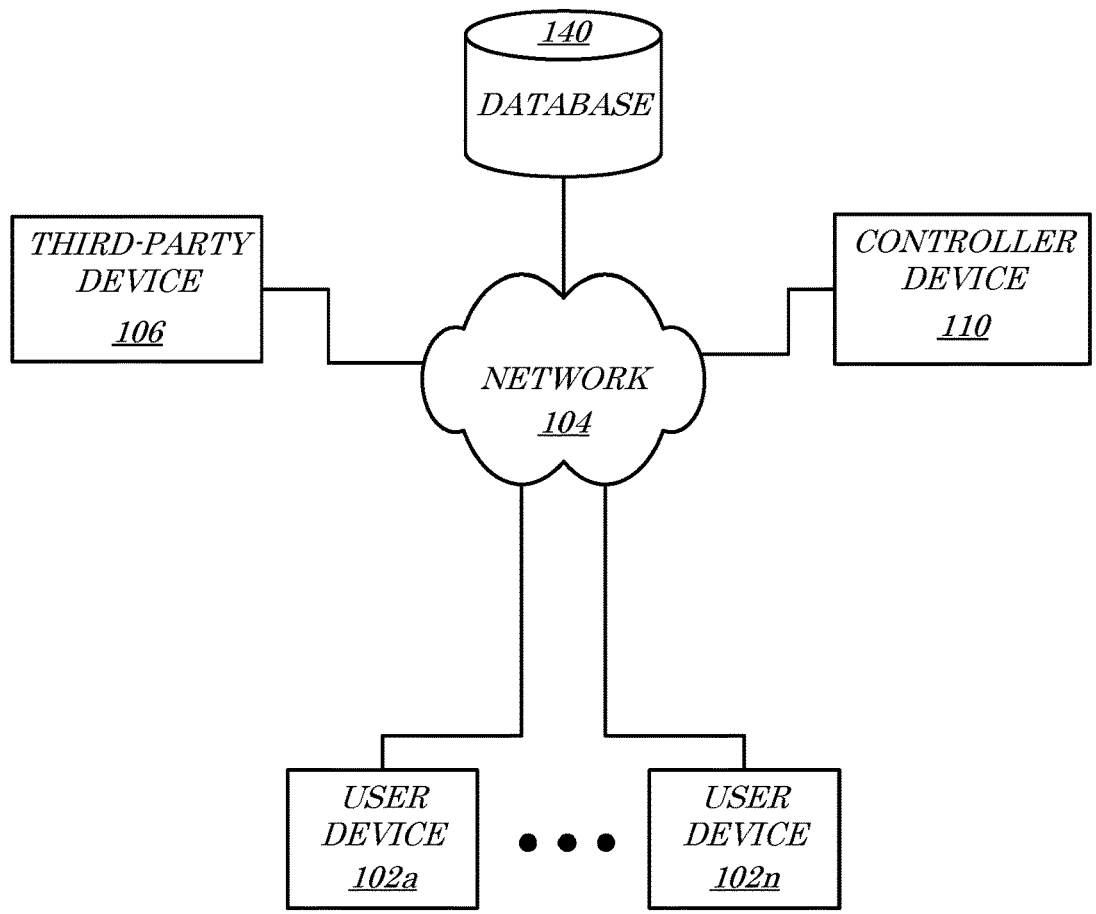
FIG. 1 is a block diagram of a system according to some embodiments.

Referring first to FIG. 1, a block diagram of a system 100 according to some embodiments is shown. In some embodiments, the system 100 may comprise a plurality of user devices 102a-n in communication via or with a network 104. According to some embodiments, the system 100 may comprise a third-party device 106, and/or a controller device 110, e.g., any or all of which may be in communication with or via the network 104. In some embodiments, any or all of the devices 102a-n, 106, 110 may comprise and/or be in communication with a database, data storage device, and/or memory device 140. According to some embodiments, communications between and/or within the devices 102a-n, 106, 110, 140 of the system 100 may be utilized to (i) group and/or consolidate classification rules, (ii) identify, define, and/or generate keywords associated with parameters that are necessary to resolve the rules, (iii) convert incoming data sets or portions thereof, (iv) search the converted data utilizing the keywords, (v) identify the presence (or lack thereof) of values for located data parameters, (vi) categorize the data set based on the presence of values, (vii) select one or more appropriate signature analysis routines based on the categorization, (viii) execute the one or more signature analysis routines to determine a classification for the input data set, and/or (ix) output the classification.

Fewer or more components 102a-n, 104, 106, 110, 140 and/or various configurations of the depicted components 102a-n, 104, 106, 110, 140 may be included in the system 100 without deviating from the scope of embodiments described herein. In some embodiments, the components 102a-n, 104, 106, 110, 140 may be similar in configuration and/or functionality to similarly named and/or numbered components as described herein. In some embodiments, the system 100 (and/or portions thereof) may comprise a pattern-based multi-stage deterministic data classification system and/or a platform programmed and/or otherwise configured to execute, conduct, and/or facilitate the methods/ algorithms 400, 500, 800 of FIG. 4, FIG. 5A, FIG. 5B, and/or FIG. 8 herein, and/or portions or combinations thereof.

According to some embodiments, the user devices 102a-n may comprise any type or configuration of computing, mobile electronic, network, client, and/or communication devices that are or become known or practicable. The user devices 102a-n may, for example, comprise one or more Personal Computer (PC) devices, computer workstations, tablet computers, such as an iPad® manufactured by Apple®, Inc. of Cupertino, CA, and/or cellular and/or wireless telephones, such as an iPhone® (also manufactured by Apple®, Inc.) or an LG V50 THINQ™ 5G smart phone manufactured by LG® Electronics, Inc. of San Diego, CA, and running the Android® operating system from Google®, Inc. of Mountain View, CA. In some embodiments, the user devices 102a-n may comprise one or more devices owned and/or operated by one or more clients or customers (or potential customers; none of which are shown), such as users attempting to submit an application comprising various data elements to the controller device 110 (and/or an entity associated therewith, such as an insurance company; not shown). According to some embodiments, the user devices 102a-n may communicate with the controller device 110 either directly or via the network 104 to automatically obtain or achieve an application data set classification (and/or associated routing and/or processing), in accordance with the pattern-based multi-stage deterministic data classification described herein.

The network 104 may, according to some embodiments, comprise a Local Area Network (LAN; wireless and/or wired), cellular telephone, Bluetooth®, Near Field Communication (NFC), and/or Radio Frequency (RF) network with communication links between the controller device 110, the user devices 102a-n, the third-party device 106, and/or the memory device 140. In some embodiments, the network 104 may comprise direct communication links between any or all of the components 102a-n, 106, 110, 140 of the system 100. The user devices 102a-n may, for example, be directly interfaced or connected to one or more of the controller device 110 and/or the third-party device 106 via one or more wires, cables, wireless links, and/or other network components, such network components (e.g., communication links) comprising portions of the network 104. In some embodiments, the network 104 may comprise one or many other links or network components other than those depicted in FIG. 1. The controller device 110 may, for example, be connected to one or more of the user devices 102a-n via various cell towers, routers, repeaters, ports, switches, and/ or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 106, 110, 140 of the system 100. The network 104 may comprise one or more cellular telephone networks with communication links between the user devices 102a-n and the controller device 110, for example, and/or may comprise an NFC or other short-range wireless communication path, with communication links between various user devices 102a-n, for example.

According to some embodiments, the third-party device 106 may comprise any type or configuration of a computerized processing device, such as a PC, laptop computer, computer server, database system, and/or other electronic device, devices, or any combination thereof. In some embodiments, the third-party device 106 may be owned and/or operated by a third party (i.e., an entity different than any entity owning and/or operating either the user devices 102a-n or the controller device 110; such as a certificate, authentication, and/or cryptographic service provider, and/ or a satellite and/or other imagery and/or business or demographic data provider). The third-party device 106 may, for example, comprise a building, property, location, and/or demographics service and/or database repository that provides location, property, and/or map data for processing by the controller device 110. In some embodiments, the third-party device 106 may provide and/or transmit account or policy data, asset and/or object data (e.g., building data from municipal records), imagery and/or imagery analysis results data, tax and/or other business data, underwriting product claim and/or loss data, etc., to the controller device 110 and/or the user devices 102a-n. According to some embodiments, the third-party device 106 may comprise a plurality of devices (e.g., sensors and/or computing devices) and/or may be associated with a plurality of third-party entities. In some embodiments, the third-party device 106 may comprise the memory device 140 (or a portion thereof), such as in the case the third-party device 106 comprises a third-party data storage service, device, and/or system, such as the Amazon® Simple Storage Service (Amazon® S3™) available from Amazon.com, Inc. of Seattle, WA or an open-source third-party database service, such as MongoDB™ available from MongoDB, Inc. of New York, NY.

In some embodiments, the controller device 110 may comprise an electronic and/or computerized controller device, such as a computer server and/or server cluster communicatively coupled to interface with the user devices 102a-n and/or the third-party device 106 (directly and/or indirectly). The controller device 110 may, for example, comprise one or more PowerEdge™ M910 blade servers manufactured by Dell®, Inc. of Round Rock, TX, which may include one or more Eight-Core Intel® Xeon® 7500 Series electronic processing devices. According to some embodiments, the controller device 110 may be located remotely from one or more of the user devices 102a-n and/or the third-party device 106. The controller device 110 may also or alternatively comprise a plurality of electronic processing devices located at one or more various sites and/or locations (e.g., a distributed computing and/or processing network).

According to some embodiments, the controller device 110 may store and/or execute specially programmed instructions (not separately shown in FIG. 1) to operate in accordance with embodiments described herein. The controller device 110 may, for example, execute one or more programs, modules, and/or routines (e.g., pattern-based, multi-stage, and/or deterministic logic) that facilitate the analysis of input data sets and classification thereof, as described herein. According to some embodiments, the controller device 110 may execute stored instructions, logic, and/or software modules to (i) group and/or consolidate classification rules, (ii) identify, define, and/or generate keywords associated with parameters that are necessary to resolve the rules, (iii) convert incoming data sets or portions thereof, (iv) search the converted data utilizing the keywords, (v) identify the presence (or lack thereof) of values for located data parameters, (vi) categorize the data set based on the presence of values, (vii) select one or more appropriate signature analysis routines based on the categorization, (viii) execute the one or more signature analysis routines to determine a classification for the input data set, and/or (ix) output the classification.

In some embodiments, the user devices 102a-n, the third-party device 106, and/or the controller device 110 may be in communication with and/or comprise the memory device 140. The memory device 140 may comprise, for example, various databases and/or data storage mediums that may store, for example, asset and/or object data, account data, tax data, business data, image data, variable data, statistical data, sensor data, parameter value identification rules, object data, classification rules, keyword identification rules, GUI element data, natural text generation data, Optical Character Recognition (OCR) rules and/or data, cryptographic keys and/or data, login and/or identity credentials, and/or instructions (e.g., pattern-based, multi-stage, and/or deterministic logic instructions) that cause various devices (e.g., the controller device 110, the third-party device 106, and/or the user devices 102a-n) to operate in accordance with embodiments described herein.

The memory device 140 may store, for example, various pattern-based, multi-stage, and/or deterministic logic code and/or mobile device applications and/or interface generation instructions, each of which may, when executed, participate in and/or cause pattern-based multi-stage deterministic classifications, as described herein. In some embodiments, the memory device 140 may comprise any type, configuration, and/or quantity of data storage devices that are or become known or practicable. The memory device 140 may, for example, comprise an array of optical and/or solid-state hard drives configured to store digital image and/or video data, image and/or object analysis data, sensor data, business data, unstructured data, and/or deterministic model data (e.g., analysis formulas and/or mathematical models), credentialing instructions and/or keys, and/or various operating instructions, drivers, etc. In some embodiments, the memory device 140 may comprise a solid-state and/or non-volatile memory card (e.g., a Secure Digital (SD) card, such as an SD Standard-Capacity (SDSC), an SD High-Capacity (SDHC), and/or an SD eXtended-Capacity (SDXC) and any various practicable form factors, such as original, mini, and micro sizes, available from Western Digital Corporation of San Jose, CA. While the memory device 140 is depicted as a stand-alone component of the controller device 110, the memory device 140 may comprise multiple components. In some embodiments, a multi-component memory device 140 may be distributed across various devices and/or may comprise remotely dispersed components. Any or all of the user devices 102a-n, the third-party device 106, and/or the controller device 110 may comprise the memory device 140 or a portion thereof, for example.

Figure 2:
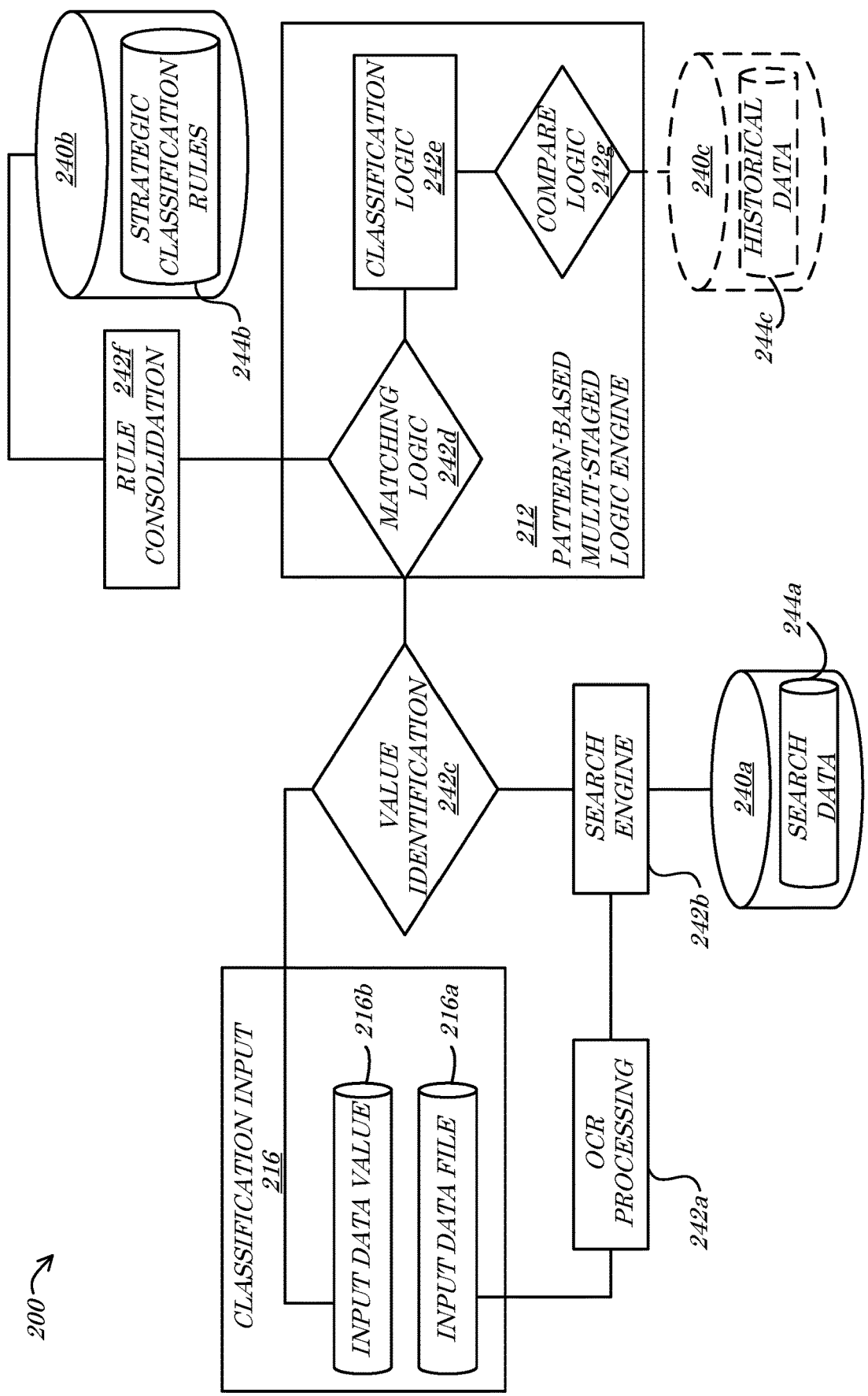
FIG. 2 is a block diagram of a system according to some embodiments.

Turning to FIG. 2, a block diagram of a system 200 according to some embodiments, is shown. In some embodiments, the system 200 may comprise a system that enables pattern-based multi-stage deterministic data classification. The system 200 may comprise, for example, a pattern-based multi-stage logic engine 212 that is programmed to accept, retrieve, identify, and/or receive classification input 216. According to some embodiments, the classification input 216 may comprise one or more input data files 216a and/or one or more input data values 216b. The classification input 216 may be received, for example, from one or more remote devices (not shown), such as the user devices 102a-n and/or the third-party device 106 of FIG. 1 herein. In some embodiments, the classification input 216 may be received (and/or otherwise identified) as part of an application or application process. According to some embodiments, the system 200 may comprise one or more databases 240a-c, algorithms 242a-g, and/or data elements 244a-c. In some embodiments, any or all of the components 212, 216a-b, 240a-c, 242a-g, 244a-c may comprise and/or be included in a server and/or centralized processing system (not shown), such as the controller device 110 of FIG. 1 herein.

According to some embodiments, the system 200 may comprise a system configured (e.g., physically and/or communicatively structured and/or coupled, and/or programmed) to automatically provide pattern-based multi-stage deterministic classification of the classification input 216. The system 200 may, for example, be configured and/or coupled to receive the classification input 216 and conduct a first phase of data processing thereof. The first phase of data processing may comprise, for example, OCR processing 242a of the input data file 216a. While the term "OCR" is utilized to describe the first phase of processing at 242a for ease of reference, in some embodiments the processing at 242a may comprise any type of data processing that converts the input data file 216a (or a portion thereof) into a different format or arrangement that is conducive to being searched. The system 200 may comprise a second phase of processing that comprises a search engine 242b, for example, that inputs the converted input data file 216a and outputs an indication of search results.

In some embodiments, the search engine 242b may search the converted classification input 216 utilizing search data 244a stored in a first database 240a. According to some embodiments, the search data 244a may comprise a listing or matrix of keywords, phrases, tags, and/or other identifiers that are indicative of a desired data parameter and/or field. In such a manner, for example, the converted input data file 216a may be analyzed by the search engine 242b to identify instances and/or occurrences within the classification input 216 that match the search data 244a. According to some embodiments, a third phase of data processing may comprise conducting a value identification 242c. The value identification 242c may comprise, for example, determining whether a desired value is identified within the classification input 216. As depicted in FIG. 2, the value identification 242c may operate directly upon the input data value 216b and/or may operate upon the output from the search engine 242b.

According to some embodiments, in order to reduce processing requirements, time, and/or data storage resources, the system 200 may utilize the value identification 242c to identify the presence (or lack thereof) of one or more values for one or more parameters within the classification input 216 but may not extract the identified values. In other words, the identification of the values, but not the values themselves, may be passed as output from the value identification 242c. In some embodiments, a fourth phase of data processing may comprise an execution of the pattern-based multi-stage logic engine 212. The pattern-based multi-stage logic engine 212 may, for example, accept output from the value identification 242c as input into matching logic 242d. The matching logic 242d may, for example, identify one or more strategic classification rules 244b (e.g., stored in a second database 240b) for which the signature of available (and/or missing) parameter values of the classification input 216 matches stored signatures. In some embodiments, the identified one or more strategic classification rules 244b may be utilized by classification logic 242e to classify the classification input 216. According to some embodiments, the identified one or more strategic classification rules 244b may be utilized alone or in conjunction with additional classification rules and/or logic to determine (e.g., calculate and/or compute) one or more classifications for the classification input 216. In such a manner, for example, the classification input 216 may be provided (e.g., as part of an application and/or application process) and automatically classified by the system 200 (and/or the pattern-based multi-stage logic engine 212 thereof).

In some embodiments, the system 200 may conduct and/or include rule consolidation 242f. The strategic classification rules 244b may be analyzed, for example, to reduce the number of strategic classification rules 244b from a first number (e.g., greater than one thousand (1,000) in some embodiments) to a second or consolidated number (e.g., less than fifty (50) in some embodiments). The strategic classification rules 244b may be consolidated by the rule consolidation 242f, for example, based on matched and/or overlapping or corresponding parameters, thresholds, criteria, rules, etc. According to some embodiments, the system 200 and/or the pattern-based multi-stage logic engine 212 may employ compare logic 242g that compares and/or otherwise evaluates the computed classification(s) to historical data 244c stored in a third database 240c. The compare logic 242g may, for example, be utilized as a check to ensure that current classifications fall within a desired threshold range of previous classifications for similar classification input 216.

Fewer or more components 212, 216, 216a-b, 240a-c, 242a-g, 244a-c and/or various configurations of the depicted components 212, 216, 216a-b, 240a-c, 242a-g, 244a-c may be included in the system 200 without deviating from the scope of embodiments described herein. In some embodiments, the components 212, 216, 216a-b, 240a-c, 242a-g, 244a-c may be similar in configuration and/or functionality to similarly named and/or numbered components as described herein. In some embodiments, the system 200 (and/or portions thereof) may comprise a pattern-based multi-stage deterministic data classification system and/or platform programmed and/or otherwise configured to execute, conduct, and/or facilitate the methods/algorithms 400, 500, 800 of FIG. 4, FIG. 5A, FIG. 5B, and/or FIG. 8 herein, and/or portions or combinations thereof.

Figure 3:
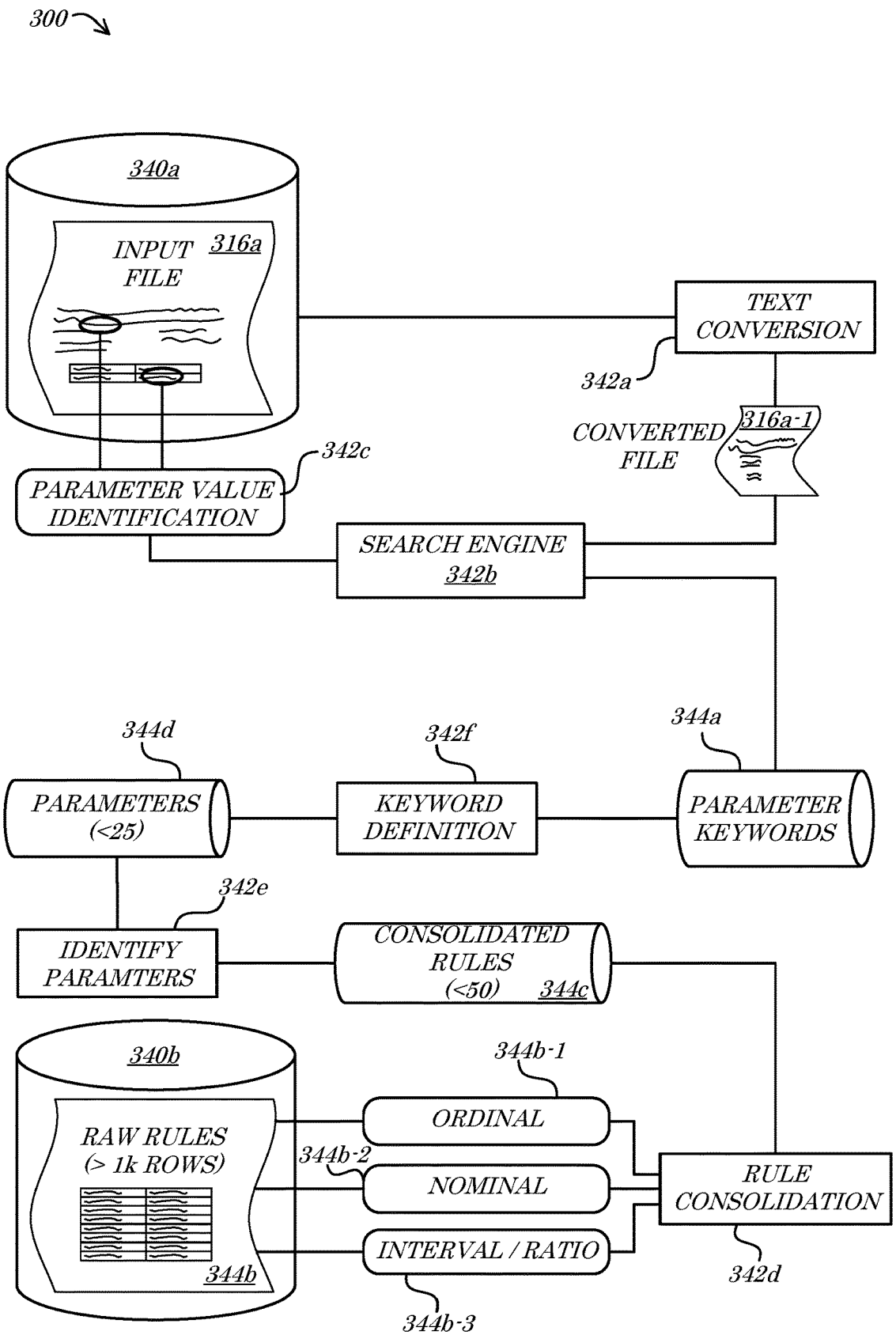
FIG. 3 is a block diagram of a system according to some embodiments.

Turning now to FIG. 3, a block diagram of a system 300 according to some embodiments is shown. In some embodiments, the system 300 may comprise a system that enables pattern-based multi-stage deterministic data classification. The system 300 may comprise, for example, an input file 316a, a plurality of databases and/or memory devices 340a-b, a plurality of algorithms or procedures 342a-f, and/or a plurality of data elements 344a-d. The input file 316a may be received as part of an application (not separately shown), for example, and/or stored in a first memory device 340a. According to some embodiments, a first algorithm or text conversion procedure 342a may accept the input file 316a as input and may operate upon (e.g., process) the input file 316a (and/or the data contents thereof) to produce a converted file 316a-1 that is passed to a second algorithm or search engine 342b. The text conversion procedure 342a may, for example, operate upon various formats of input files 316a to convert non-standard data and/or image elements into standardized characters (e.g., American Standard Code for Information Interchange (ASCII) characters and/or codes in accordance with the ANSI X3.4-1986 published by the American National Standards Institute (ANSI) of New York, NY (1986), and/or other standardized characters and/or values, such as in accordance with the "Information technology—ISO 7-bit coded character set for information interchange" ISO/IEC 646 published by the International Organization for Standardization (ISO)/International Electrotechnical Commission (IEC) of Geneva, Switzerland (1965), and/or "Unicode" versions "Unicode Transformation Format—8-bit" (UTF-8) and/or "Unicode Transformation Format—16-bit" (UTF-16) published by the Unicode Consortium of Mountain View, CA (1993; 1996)).

According to some embodiments, the search engine 342b may search through the standardized characters of the converted file 316a-1 contents to conduct a third algorithm or parameter value identification 342c. The parameter value identification 342c may, for example, comprise identification of instances of a value for a particular searched parameter (e.g., based on predefined search criteria, such as parameter keywords 344a). According to some embodiments, functional operation of the system 300 may comprise the parameter value identification 342c only identifying instances (e.g., the presence or absence) of values, while intentionally avoiding, delaying, or refraining from extracting the identified values. While the identification of value instances is depicted for ease of explanation as occurring with respect to the input file 316a in FIG. 3, as the search engine 342b operates upon the converted file 316a-1, such identifications may also or alternatively occur within the converted file 316a-1 with or without corresponding identifications within the original input file 316a.

In some embodiments, the parameter keywords 344a (and/or other search parameters, not shown) may be identified, derived, and/or computed from and/or based on a rule set comprising raw rules 344b (e.g., stored in a second memory device 340b). As depicted, in some embodiments the raw rules 344b may comprise a large number of rules, data rows, criteria, etc., such as more than one thousand (1,000) rows of rules/data. In some embodiments, the rules/data of the raw rules 344b may comprise rule types and/or criteria that are ordinal 344b-1, nominal 344b-2, and/or interval/ratio 344b-3 in nature. According to some embodiments, the raw rules 344b may be grouped, sorted, ranked, filtered, and/or otherwise processed in accordance with the rule types 344b-1, 344b-2, 344b-3. In some embodiments, the raw rules 344b may be consolidated by a fourth algorithm or a rule consolidation 342d. The rule consolidation 342d may, for example, identify the raw rules 344b and reduce the number of rules from a first number (e.g., the raw rules 344b) to a subset or second number of consolidated rules 344c (e.g., less than fifty (50) in some embodiments). In some embodiments, the consolidated rules 344c may be defined by computationally and/or logically collapsing, grouping, and/or merging various criteria, logic, and/or formulas defined by each row of the raw rules 344b into rows of common criteria, logic, and/or formulas. The rule consolidation 342d may comprise, for example, (i) identifying at least one assigned condition, criteria, threshold, etc., for each data row of the raw rules 344b, (ii) identifying at least one commonality (e.g., data match) between the assigned conditions, criteria, thresholds of at least two of the raw rules 344b data rows, and/or (iii) grouping and/or merging the at least two of the raw rules 344b data rows based on the identified at least one commonality.

According to some embodiments, functional operation of the system 300 may comprise executing a fifth algorithm or identifying parameters 342e. The consolidated rules 344c may be searched, analyzed, and/or computationally evaluated, for example, to identify a listing of parameters 344d (and/or parameter values or value types) that are required for evaluation of each of the consolidated rules 344c/data rows thereof. In such a manner, for example, all parameters 344d (and/or associated values) necessary to classify input (e.g., the input file 316a and/or other input not shown) may be identified. In some embodiments, such as in the case that each consolidated rule 344c invokes multiple parameters 344d, there may be more identified parameters 344d than the number of consolidated rules 344c. In cases where many of the consolidated rules 344c share parameters 344d, however, there may be fewer parameters 344d than consolidated rules 344c/data rows thereof. In some cases, there may be fewer than twenty-five (25) identified parameters 344d necessary for evaluation of any or all of the consolidated rules 344c.

In some embodiments, functional operation of the system 300 may comprise execution of a sixth algorithm or keyword definition 342f. The keyword definition 342f may operate on the identified parameters 344d as input, for example, to compute the parameter keywords 344a (and/or other search criteria and/or data, not shown) utilized by the search engine 342b. The parameter keywords 344a may be extracted and/or derived from the identified parameters 344d, such as from the names, titles, headers, descriptions, and/or other data or metadata descriptive thereof. In some embodiments, the identified parameters 344d may be converted to standardized characters and/or values, such as ASCII characters/values and/or strings, summations, and/or encoded variations thereof to define the parameter keywords 344a. The parameter keywords 344a may comprise natural language words, phrases, sentences, or character combinations, for example, and/or may comprise various codes, values, symbols (e.g., mathematical symbols, variable identifiers), etc., that are representative of the identified parameters 344d.

Fewer or more components 316a, 316a-1, 340a-b, 342a-f, 344a-d, 344b-1, 344b-2, 344b-3 and/or various configurations of the depicted components 316a, 316a-1, 340a-b, 342a-f, 344a-d, 344b-1, 344b-2, 344b-3 may be included in the system 300 without deviating from the scope of embodiments described herein. In some embodiments, the components 316a, 316a-1, 340a-b, 342a-f, 344a-d, 344b-1, 344b-2, 344b-3 may be similar in configuration and/or functionality to similarly named and/or numbered components as described herein. In some embodiments, the system 300 (and/or portions thereof) may comprise a pattern-based multi-stage deterministic data classification system and/or platform programmed and/or otherwise configured to execute, conduct, and/or facilitate the methods/algorithms 400, 500, 800 of FIG. 4, FIG. 5A, FIG. 5B, and/or FIG. 8 herein, and/or portions or combinations thereof.

III. Pattern-Based Multi-Stage Deterministic Data Classification Methods

Figure 4:
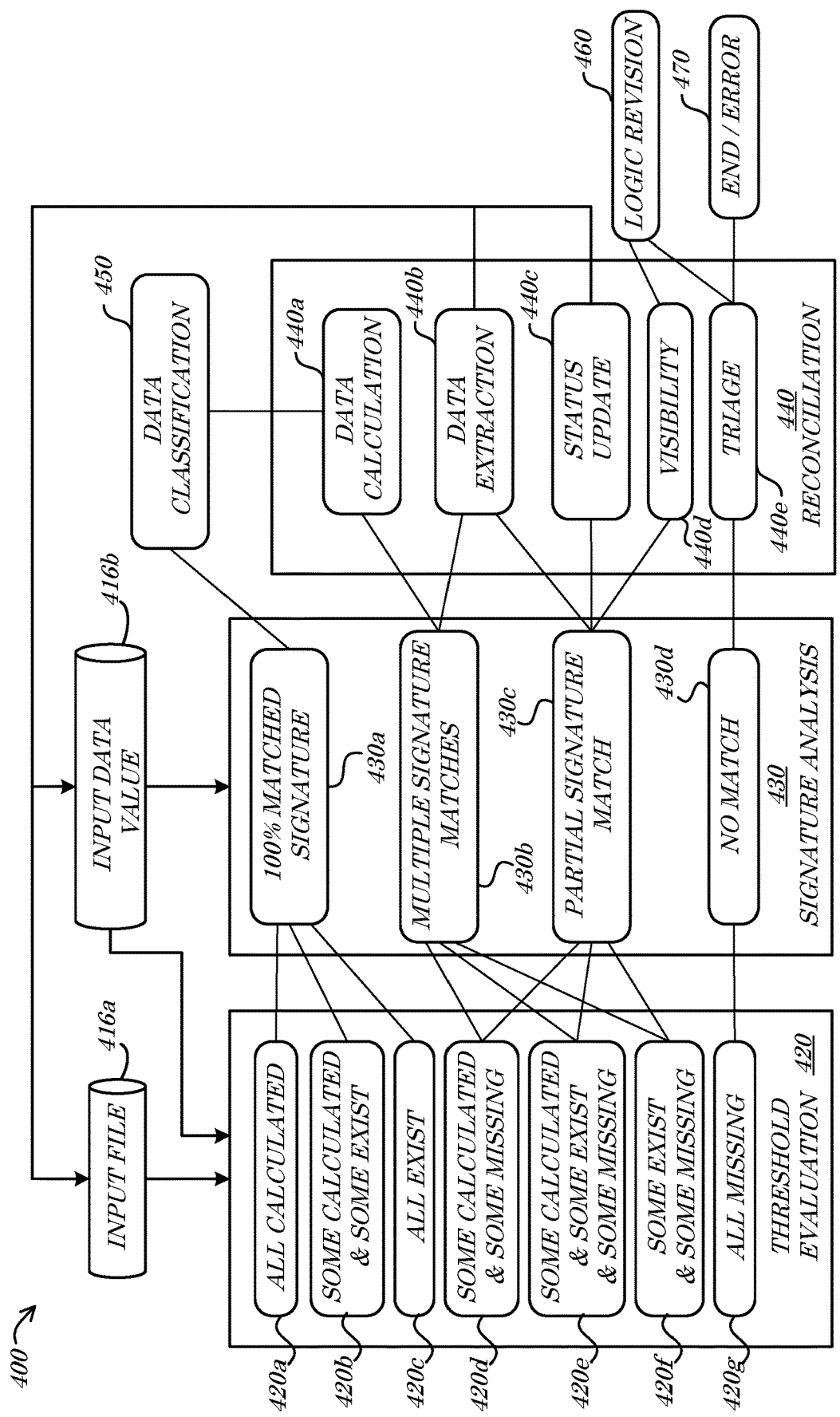
FIG. 4 is a flow diagram of a method according to some embodiments.
Figure 6:
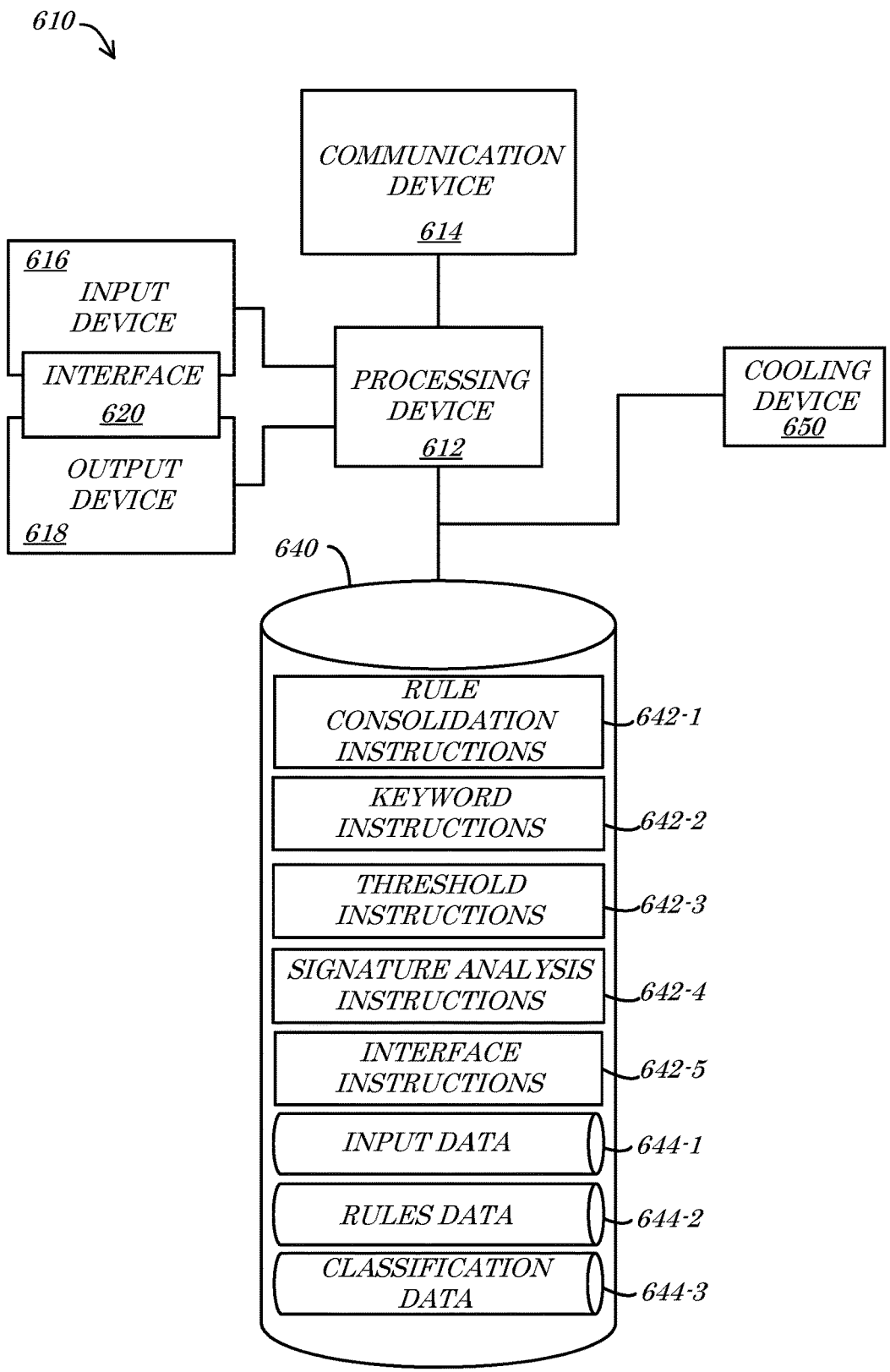
FIG. 6 is a block diagram of an apparatus according to some embodiments.
Figure 7A:
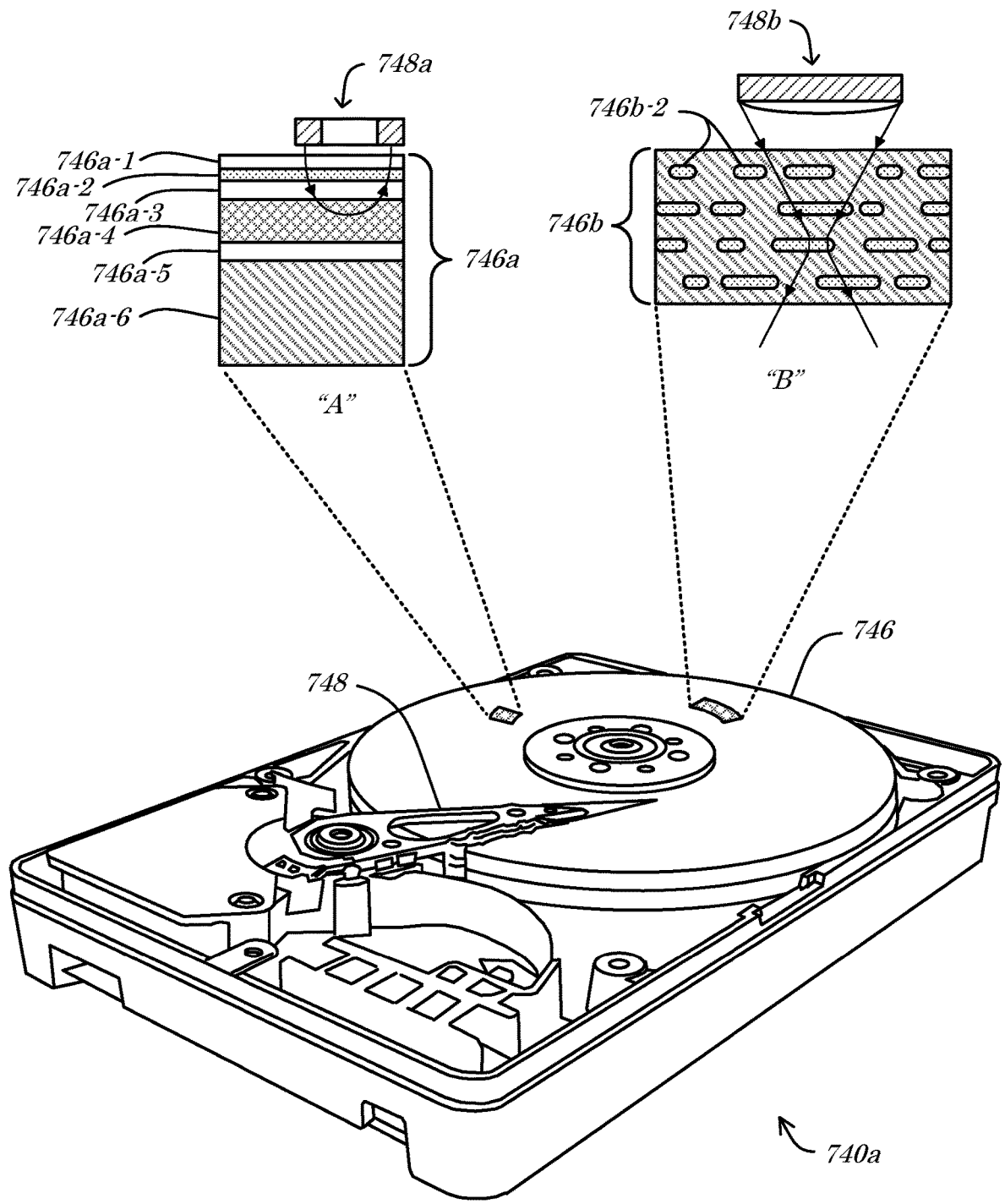
FIG. 7A, FIG. 7B, FIG. 7C, FIG. 7D, and FIG. 7E are perspective diagrams of exemplary data storage devices according to some embodiments.
Figure 7B:
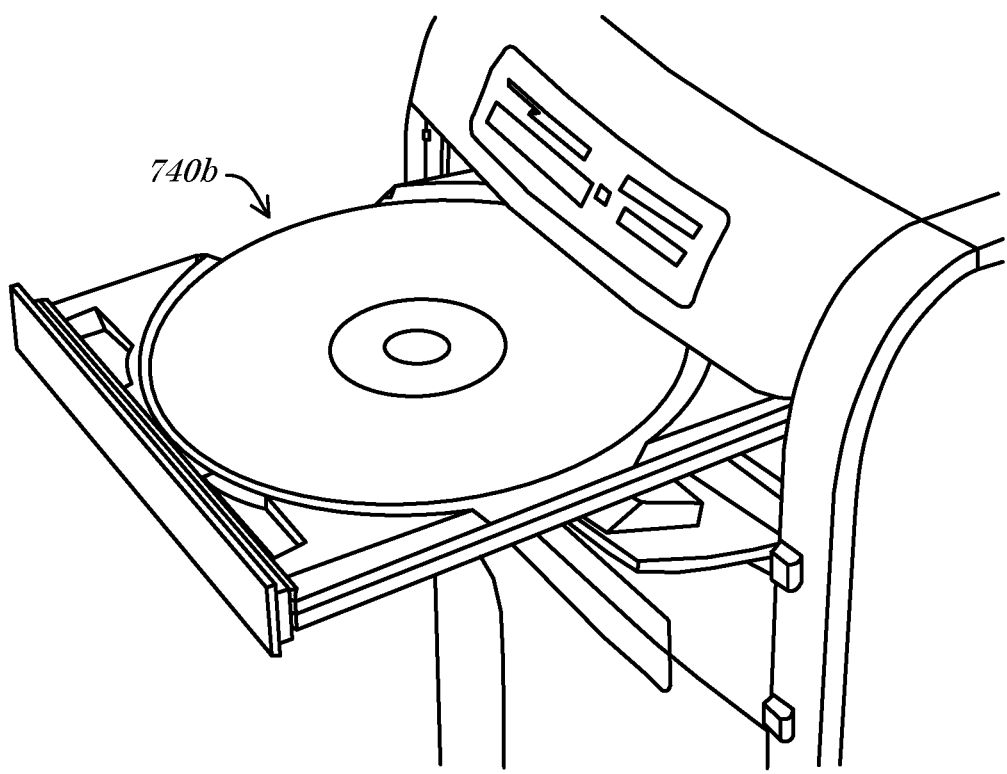
Figure 7C:
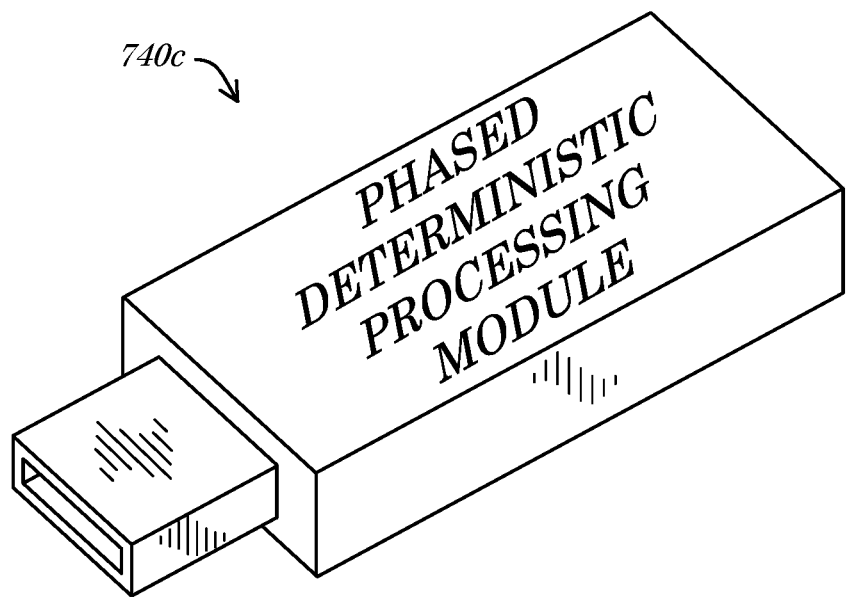
Figure 7D:
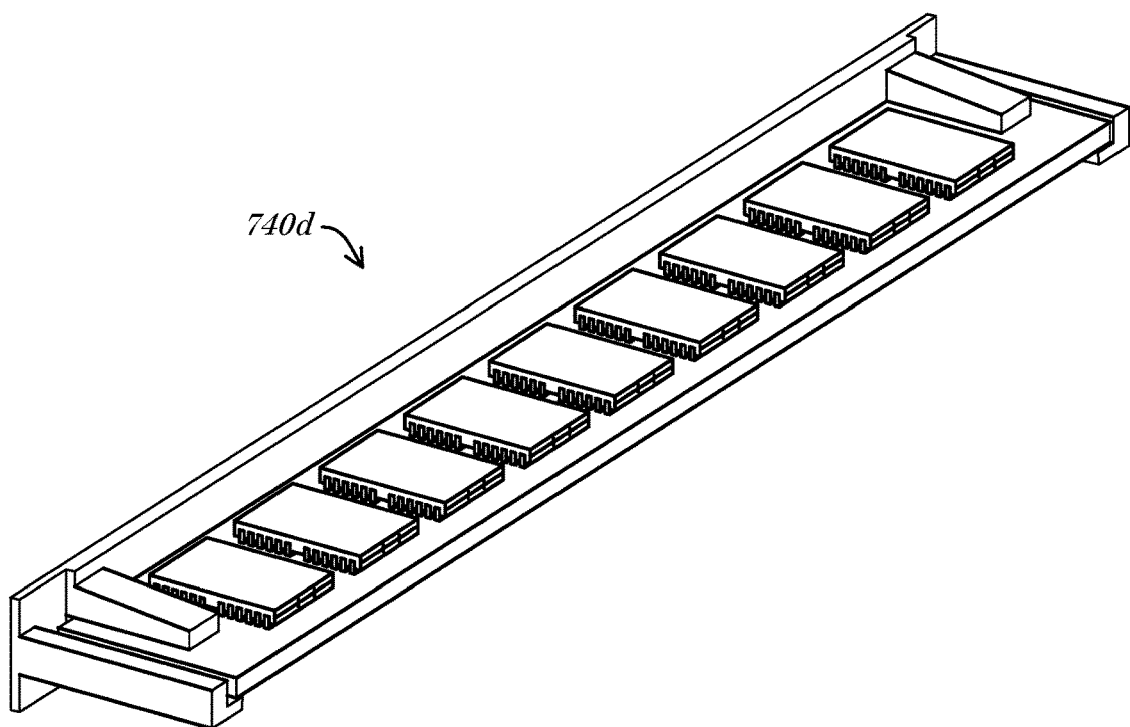
Figure 7E:
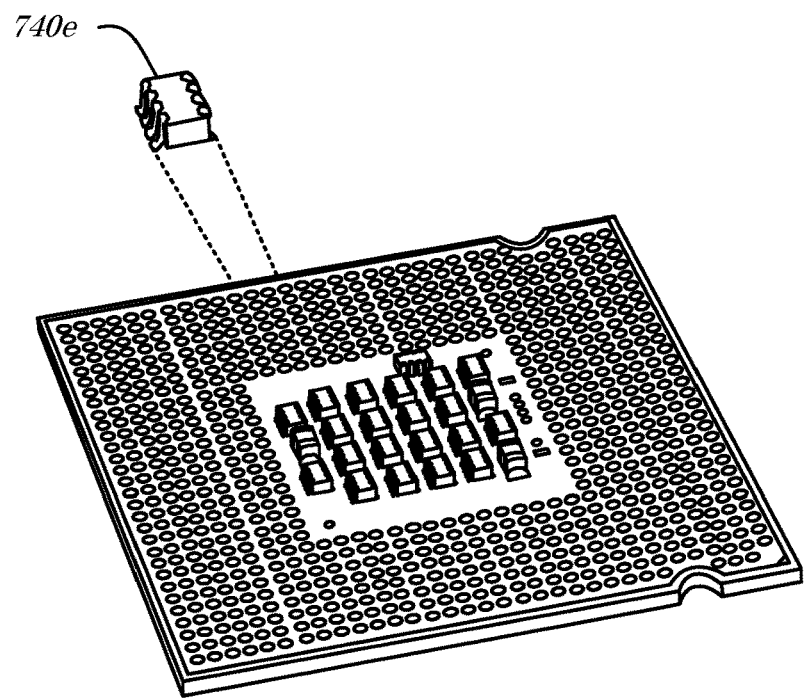

Referring now to FIG. 4, a flow diagram of a method 400 according to some embodiments is shown. In some embodiments, the method 400 may be performed and/or implemented by and/or otherwise associated with one or more specialized and/or specially-programmed computers (e.g., one or more of the user devices 102a-n, third-party device 106, the controller device 110, and/or the apparatus 610 of FIG. 1 and/or FIG. 6 herein), computer terminals, computer servers, computer systems and/or networks, and/or any combinations thereof (e.g., by one or more multi-threaded and/or multi-core processing units of a pattern-based multi-stage deterministic data classification processing system). In some embodiments, the method 400 may be embodied in, facilitated by, and/or otherwise associated with various input mechanisms and/or interfaces (such as the interface 620 of FIG. 6 herein).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140, 240a-c, 340a-b, 640, 740a-e, 840 of FIG. 1, FIG. 2, FIG. 3, FIG. 6, FIG. 7A, FIG. 7B, FIG. 7C, FIG. 7D, FIG. 7E, and/or FIG. 8 herein) may store thereon instructions that when executed by a machine (such as a computerized processor) result in performance according to any one or more of the embodiments described herein.

In some embodiments, the method 400 may operate upon and/or be triggered by an identification and/or receipt of one or more of an input file 416a and an input data value 416b. Either or both of the input file 416a and the input data value 416b may be received from a remote and/or mobile user device (not shown; e.g., the user devices 102a-n of FIG. 1 herein) as part of an application submitted to an entity. The application may comprise, for example, but is not limited to, an application for an underwriting product (such as an insurance policy or product) submitted by a customer or potential customer to an insurance company. In some embodiments, the input file 416a may comprise any quantity or type of data file that is or becomes known or practicable. Indeed, one of the benefits provided by the method 400 (and embodiments described herein generally) is the enhanced ability to efficiently and accurately operate upon an unpredictable quantity, configuration, and/or type of input file 416a submitted as part of or with the application. According to some embodiments, the input data value 416b may comprise a value provided directly and/or explicitly in the application/input. The input data value 416b may comprise, for example, a JavaScript Object Notation (JSON) value and/or other format of value representative of a parameter, such as, but not limited to, a Standard Industrial Classification (SIC) code and/or a North American Industry Classification System (NAICS) code. In some embodiments, the input file 416a and/or the input data value 416b may be processed as part of a data preparation data processing routine (not separately shown) to filter, standardize, deduplicate, and/or otherwise prepare the input 416a, 416b for further analysis by the method 400.

According to some embodiments, the method 400 may comprise receiving (e.g., by an electronic processing device and/or from a mobile application of a mobile electronic device of a consumer) one or more instances of either or both of the input file 416a and the input data value 416b. A consumer (e.g., a customer or potential customer) may utilize the mobile electronic device, for example, to input data descriptive of either or both of the input file 416a and the input data value 416*b*. The consumer may enter the input data value 416*b* as a JSON entry into an online form, for example, and/or may attached one or more electronic files comprising the input file 416*a*, such as one or more image files, word processing files, and/or other structured, semi-structured, and/or unstructured data files. In some embodiments, the method 400 may comprise execution of various algorithms, procedures, processes, and/or encoded modules that result in one or more of a threshold evaluation 420, a signature analysis 430, and/or a reconciliation 440. According to some embodiments, the threshold evaluation 420, signature analysis 430, and reconciliation 440 processes may be conducted to process data as input for a data classification 450 procedure. The data classification 450 may, for example, classify the input file 416*a*, the input data value 416*b*, and/or the overall application into one or more predefined classifications, such as business units, types, and/or other groupings and/or designations.

In some embodiments, the threshold evaluation 420 may comprise searching through the input data values 416*b* and/or the input file 416*a* (e.g., a converted text version thereof) utilizing one or more predefined keywords and/or data elements to identify whether values for desired parameters exist within the input file 416*a*. According to some embodiments, the threshold evaluation 420 may determine, for each desired parameter value, whether the value (i) exists (but needs to be extracted from the input file 416*a*), (ii) can be calculated (e.g., based on identified values in the input file 416*a* and/or in the input data value 416*b*), or (iii) is missing. In some embodiments, the threshold evaluation 420 may categorize each input file 416*a* and/or application (e.g., a set of input files 416*a*) into one of seven (7) different data availability scenarios 420*a-g*. The data availability scenarios 420*a-g* may comprise, in some embodiments, a first scenario in which all values are identified as calculated (or calculatable) 420*a*, a second scenario in which some values are identified as calculated (or calculatable) and some are identified as existing 420*b*, a third scenario in which all values are identified as existing 420*c*, a fourth scenario in which some values are identified as calculated (or calculatable) and some are identified as missing 420*d*, a fifth scenario in which some values are identified as calculated (or calculatable), some are identified as existing, and some are identified as missing 420*e*, a sixth scenario in which some values are identified as existing and some are identified as missing 420*f*, and a seventh scenario in which all values are identified as missing 420*g*. According to some embodiments, the different data availability scenarios 420*a-g* may be mutually exclusive. In some embodiments, the data availability scenario 420*a-g* in which the current application and/or input file 416*a* is categorized into by the threshold evaluation 420 may be utilized as input into the signature analysis 430 process.

According to some embodiments, the signature analysis 430 may comprise application of a plurality of signature analysis rules to the categorized data from the threshold evaluation 420. Each possible data availability scenario 420*a-g* from the threshold evaluation 420 may automatically map, for example, to one or more of four (4) different signature scenarios 430*a-d* and/or corresponding signature analysis rules. In the cases that all values are identified as calculated (or calculatable) 420*a*, some values are identified as calculated (or calculatable) and some are identified as existing 420*b*, and all values are identified as existing 420*c*, for example, a first signature scenario in which a one hundred percent (100%) matched signature 430*a* can be obtained may be mapped. In the cases that some values are identified as calculated (or calculatable) and some are identified as missing 420*d*, some values are identified as calculated (or calculatable), some are identified as existing, and some are identified as missing 420*e*, or some values are identified as existing and some are identified as missing 420*f*, a second signature scenario in which multiple signature matches 430*b* can be obtained or a third signature scenario in which at least one partial signature match 430*c* can be obtained, may be mapped. In the case that all values are identified as missing 420*g* a fourth signature scenario in which no match 430*d* can be obtained may be mapped. According to some embodiments, such as in the case that all values are identified as calculated (or calculatable) 420*a* and the one hundred percent (100%) matched signature 430*a* can be obtained, the method 400 may proceed directly to the data classification 450, e.g., where a data classification may be computed based on the known calculated (or calculatable) values. In some embodiments, such as in the cases that some values are identified as calculated (or calculatable) and some are identified as existing 420*b*, and all values are identified as existing 420*c*, and the one hundred percent (100%) matched signature 430*a* can be obtained, the method 400 may proceed to the reconciliation 440 (e.g., to one or more of a first subroutine or data calculation 440*a* and a second subroutine or data extraction 440*b* thereof). According to some embodiments, any or all of the second, third, and fourth signature scenarios 430*b-d* may be utilized to selectively map and/or route the method 400 to particular subroutines within the reconciliation 440.

In some embodiments, the reconciliation 440 may comprise a plurality of subroutines 440*a-e* or modules that are mapped to receive the selection and/or identification of one of the signature scenarios 430*a-d* (and/or associated rules) as input. In the case that the one hundred percent (100%) matched signature 430*a* can be obtained, for example, the reconciliation 440 may invoke and/or comprise one or more of the data calculation 440*a* and/or the data extraction 440*b*. In the case that data values are known but are required to be calculated (e.g., some values are identified as calculated (or calculatable) and some are identified as existing 420*b* or all values are identified as existing 420*c*) utilizing a formula, model, and/or logical routine, for example, the method 400 may proceed to the data calculation 440*a* to calculate the required value(s) before proceeding to the data classification 450 (where the calculated values will be utilized). In some embodiments, such as in the case that data values are known (have been identified) to exist (e.g., some values are identified as calculated (or calculatable) and some are identified as existing 420*b* or all values are identified as existing 420*c*), the method 400 may proceed to the data extraction 440*b* to extract the required/identified value(s) (e.g., from the input file 416*a*) before proceeding to the data classification 450 (where the extracted values will be utilized). In some embodiments, in the case that the output of the signature analysis 430 comprises the multiple signature matches 430*b*, the data calculation 440*a* and/or the data extraction 440*b* may be utilized as needed to prepare as many available desired parameter values to the data classification 450 as possible. In some cases, the full data value set (i.e., calculated, existing, already available) may be utilized by the data classification 450 to select between two or more signature matches, e.g., by selecting the most matching/likely choice and/or by implementing a tie-breaking routine (e.g., random, round-robin, and/or weighted selection).

According to some embodiments, in the case that the output of the signature analysis 430 comprises the partial signature match 430*c*, the data calculation 440*a* and/or the data extraction 440*b* may be utilized as needed to prepare as many available desired parameter values to the data classification 450 as possible. In some embodiments, in the case of a partial signature match 430*c* the reconciliation 440 may invoke and/or comprise one or more of a status update 440*c* and a visibility 440*d* subroutine. The status update 440*c* may, for example, send or trigger a request for additional input (e.g., to the consumer) in an attempt to solicit and/or locate missing parameter values (e.g., some values are identified as calculated (or calculatable) and some are identified as missing 420*d*, some values are identified as calculated (or calculatable), some are identified as existing, and some are identified as missing 420*e*, or some values are identified as existing and some are identified as missing 420*f*). According to some embodiments, the request/query may be provided via a Graphical User Interface (GUI) output via a consumer's computing (e.g., mobile) device. In some embodiments, the visibility 440*d* subroutine may send or trigger an alert to an entity associated with operation of the method 400 (such as an insurance company employee) to provide notice of missing parameter values. In some embodiments, the visibility 440*d* subroutine may be utilized after an attempt to locate missing parameter values via execution of the status update 440*c* subroutine has been attempted and the method 400 returns to a partial signature match 430*c* with some or all of the same parameter values missing. Such a repeated identification of a missing parameter value may, for example, indicate that available product offerings aligning with the available classifications may be deficient and such deficiency may be brought to the attention of (e.g., made visible to) personnel via the visibility 440*d* subroutine.

In some embodiments, the visibility 440*d* subroutine may be followed by and/or may include a logic revision 460 algorithm. The logic revision 460 algorithm may be triggered to edit and/or update the threshold evaluation 420, the signature analysis 430, and/or the data classification 450, for example, to include and/or incorporate a new product (e.g., a new underwiring product) that takes into account the missing parameter/parameter value (e.g., to fill a gap in product and/or marketplace coverage). According to some embodiments, in the case that all parameter values are missing 420*g* and no match 430*d* of signatures rules can be accomplished, the method 400 and/or the reconsolidation 440 may comprise a triage 440*e* module. The triage 440*e* module may, for example, analyze the missing parameters and/or parameter values to determine whether there may be a gap in product coverage (in which case the method 400 may continue to the logic revision 460) or whether the method 400 should end 470 (e.g., in an error).

According to some embodiments, the data classification 450 may comprise application, execution, and/or evaluation of one or more classification rules. The rules may, for example, be selected and/or defined based on which logical (and deterministic) path the method 400 may follow to arrive at the data classification 450 based on the input 416*a-b*. In some embodiments, the rules applied by the data classification 450 may comprise a set of consolidated rules as described herein. While not explicitly depicted in FIG. 4, output from the data classification 450 may comprise an identification of one or more data classifications assigned to the application (and/or input 416*a-b*). According to some embodiments, such classification results may be output via one or more transmissions, signals, and/or process executions. In some embodiments, the classification results may be output via a GUI displayed to a consumer (and/or other user). In accordance with embodiments herein, the method 400 may provide the classification results/output in a manner that utilizes less processing resources and/or data storage resources than other classification processes. As described herein, for example, performing a deterministic processing routine in a phased and/or multi-staged approach (e.g., as depicted in FIG. 4) may prevent unnecessary data extraction events which would otherwise be heavily burdensome on computing resources. Such a deterministic approach to the classification data processing may also provide for auditable and/or explainable result sets, which reduces the time and cost of troubleshooting errors.

Figure 5A:
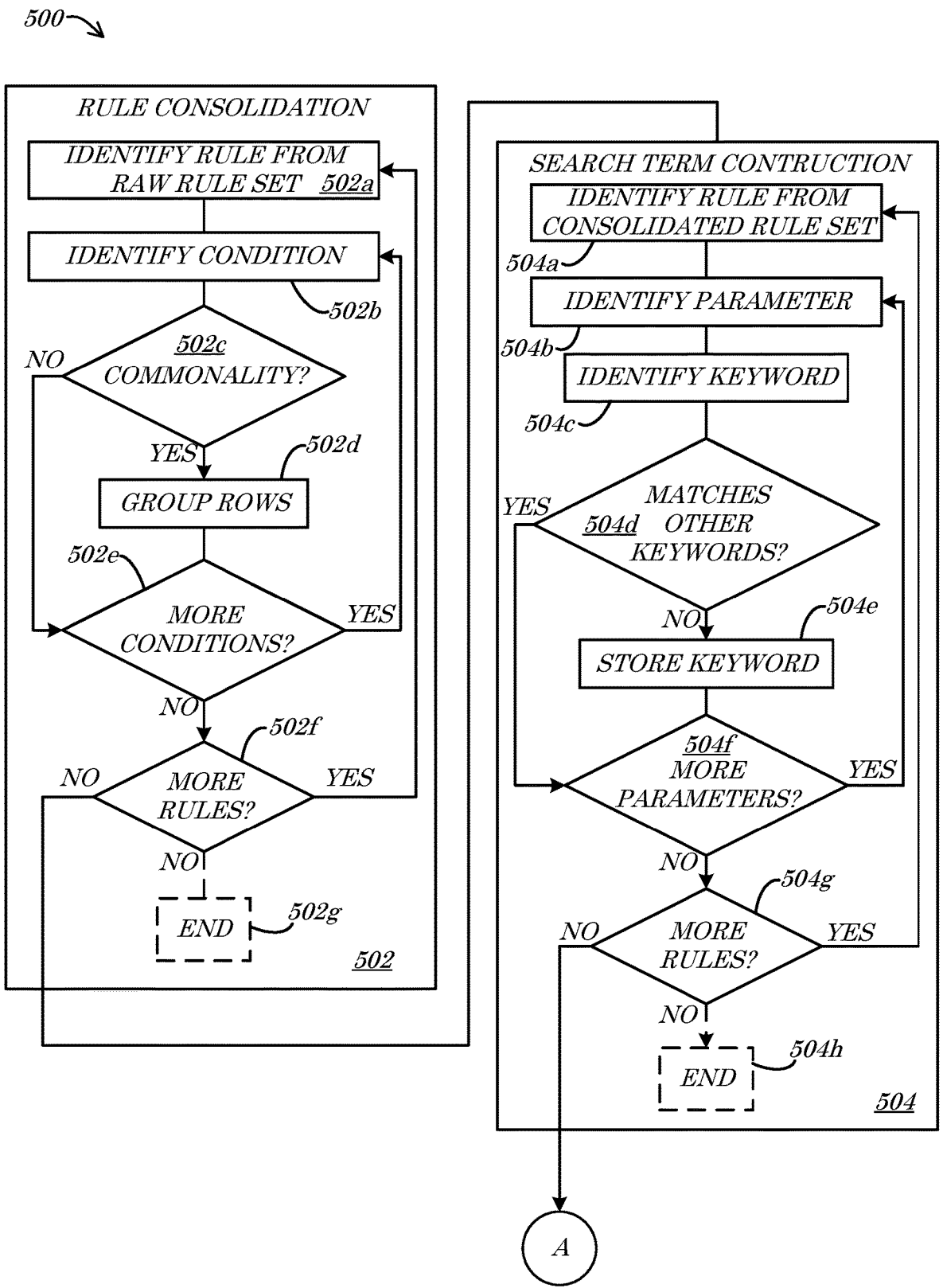
FIG. 5A and FIG. 5B are flow diagrams of a method according to some embodiments.
Figure 5B:
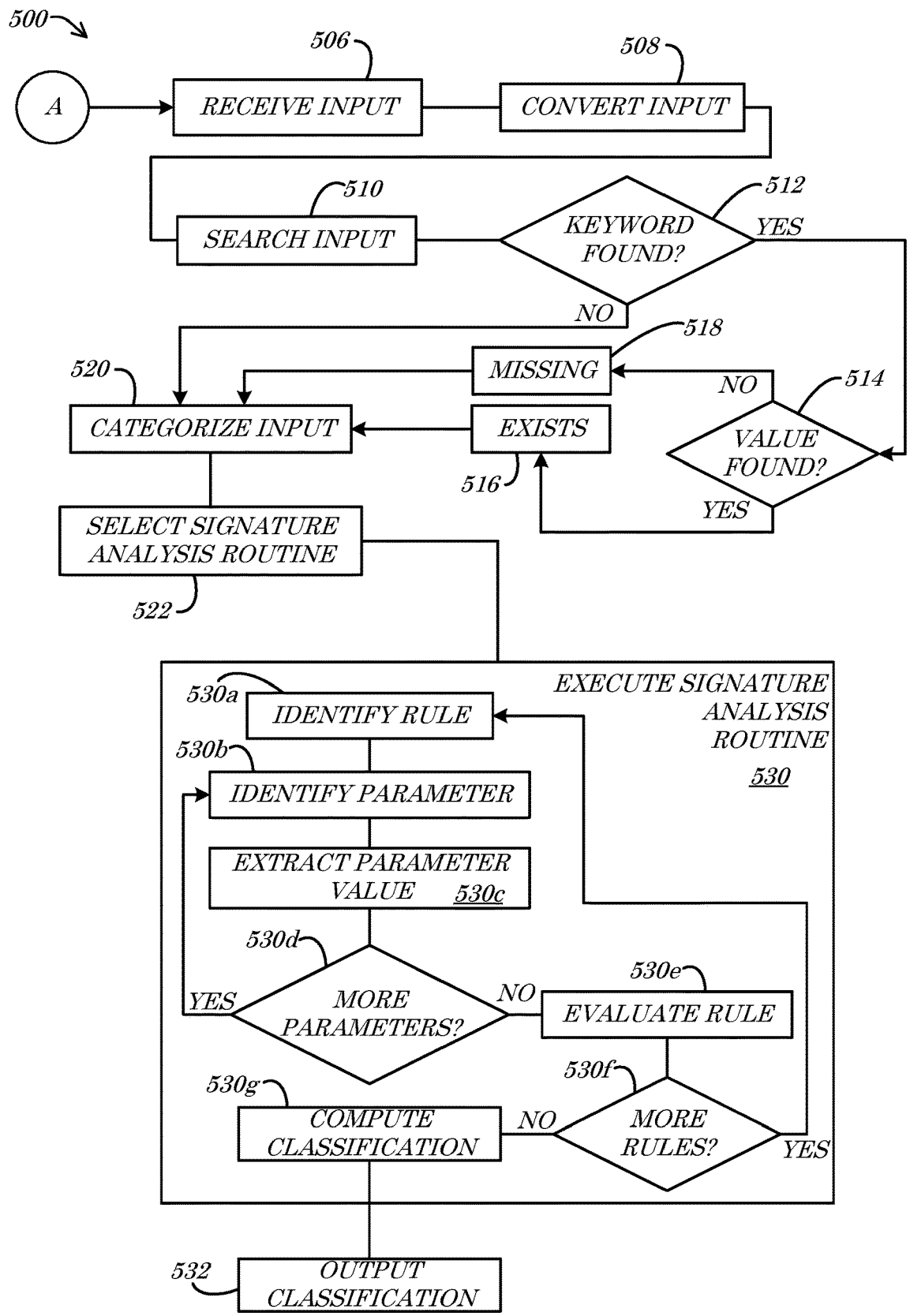

Turning now to FIG. 5A and FIG. 5B, flow diagrams of a method 500 according to some embodiments are shown. In some embodiments, the method 500 may be performed and/or implemented by and/or otherwise associated with one or more specialized and/or specially-programmed computers (e.g., one or more of the user devices 102*a-n*, third-party device 106, the controller device 110, and/or the apparatus 610 of FIG. 1 and/or FIG. 6 herein), computer terminals, computer servers, computer systems and/or networks, and/or any combinations thereof (e.g., by one or more multi-threaded and/or multi-core processing units of a pattern-based multi-stage deterministic data classification system). In some embodiments, the method 500 may be embodied in, facilitated by, and/or otherwise associated with various input mechanisms and/or interfaces (such as the interface 620 of FIG. 6 herein).

In some embodiments, the method 500 may comprise various steps, routines, modules, algorithms, and/or engines, such as rule consolidation 502 and/or search term construction 504, as depicted in FIG. 5A. According to some embodiments, any or all of the steps, routines, modules, algorithms, and/or engines may be optional and the method 500 may be conducted in the absence thereof. In some embodiments, any or all of the steps, routines, modules, algorithms, and/or engines may also or alternatively be performed intermittently, on-demand, or as one-time setup procedures. The rule consolidation 502 and/or search term construction 504 may, for example, be performed once or intermittently (e.g., at various times and/or volume/traffic intervals), as opposed to with every execution of the method 500.

According to some embodiments, the method 500 and/or the rule consolidation 502 may comprise identifying (e.g., by an electronic processing device) a rule from a raw rule set, at 502*a*. The raw rule set may comprise, for example, a full, original, and/or unedited listing of strategic classification rules stored in one or more databases, tables, files, etc. In some embodiments, the method 500 and/or the rule consolidation 502 may cycle through the listing by selecting a first rule and/or data row from the raw rule set. According to some embodiments, the method 500 and/or the rule consolidation 502 may comprise identifying (e.g., by the electronic processing device) a criterion, threshold, and/or condition, at 502*b*. Each rule and/or data row may, for example, comprise and/or define one or more criteria, thresholds, and/or conditions stored in relation thereto. In some embodiments, the method 500 and/or the rule consolidation 502 may comprise determining (e.g., by the electronic processing device) whether the identified one or more criteria, thresholds, and/or conditions corresponding to the identified rule/data row have commonality, e.g., with a previously identified and/or evaluated rule/data row and/or one or more criteria, thresholds, and/or conditions thereof, at 502*c*. In the case that the identified one or more criteria, thresholds, and/or conditions comprise a condition based on a mathematical formula or expression, for example, an identical (or equivalent) mathematical formula or expression in a different condition may be identified as a commonality (e.g., a match or equivalence). In the case that the identified one or more criteria, thresholds, and/or conditions comprises a threshold defining a numerical range for a particular parameter, for example, an identical (or equivalent) numerical range for the particular parameter in a different condition may be identified as a commonality (e.g., a match or equivalence).

According to some embodiments, in the case that a commonality is identified, computed, and/or otherwise determined, the method 500 and/or the rule consolidation 502 may proceed to grouping rows, at 502*d*. In some embodiments, the grouping of rows at 502*d* may comprise merging, collapsing, consolidating, and/or otherwise combining the currently-identified data row/rule and the other data row/rule identified as having a commonality therewith. According to some embodiments, the grouping of rows at 502*d* may also or alternatively comprise creating a data relationship, such as a common flag, pointer, and/or tag that relates the two data rows/rules.

In some embodiments, after the grouping of rows at 502*d* and/or upon a negative determination of a commonality at 502*c*, the method 500 and/or the rule consolidation 502 may comprise and/or proceed to determining (e.g., by the electronic processing device) whether there are more criteria, thresholds, and/or conditions remaining to be evaluated, at 502*e*. The data rows associated with the identified raw rule may, for example, be consulted to determine whether any associated rows exist that have not yet been analyzed (e.g., by utilization of a programmatic pointer and/or counter). In the case that at least one additional criterion, threshold, and/or condition remains, the method 500 and/or the rule consolidation 502 may proceed back to identifying additional criteria, thresholds, and/or conditions at 502*b*. In the case that all criteria, thresholds, and/or conditions have been evaluated, the method 500 and/or the rule consolidation 502 may proceed to and/or comprise determining (e.g., by the electronic processing device) whether there are more rules remaining to be evaluated, at 502*f*. The raw rule set may, for example, be consulted to determine whether any associated rules exist that have not yet been analyzed (e.g., by utilization of a programmatic pointer and/or counter).

In the case that at least one additional rule remains, the method 500 and/or the rule consolidation 502 may proceed back to identifying additional rules from the raw rule set at 502*a*. In the case that all rules have been evaluated, the method 500 and/or the rule consolidation 502 may proceed to and/or comprise (i) ending, at 502*g* or (ii) proceeding to the search term construction 504. While the search term construction 504 is depicted and described as occurring after the rule consolidation 502 in FIG. 5A, in some embodiments, the order may be reversed or the rule consolidation 502 and the search term construction 504 may occur simultaneously (e.g., asynchronous or synchronous multi-threaded processing).

According to some embodiments, the method 500 and/or the search term construction 504 may comprise identifying (e.g., by the electronic processing device) a rule from the consolidated rule set, at 504*a*. The consolidated rule set may comprise, for example, a merged, filtered, collapsed, combined, and/or otherwise consolidated listing of strategic classification rules stored in one or more databases, tables, files, etc. In some embodiments, the method 500 and/or the search term construction 504 may cycle through the listing by selecting a first rule and/or data row from the consolidated rule set. According to some embodiments, the method 500 and/or the search term construction 504 may comprise identifying (e.g., by the electronic processing device) a parameter, at 504*b*. Each rule and/or data row may, for example, comprise and/or define one or more criteria, thresholds, and/or conditions stored in relation thereto, with each such criterion, threshold, and/or condition defining, identifying, and/or invoking or requiring at least one parameter (e.g., variable, constant, metric) for the resolution thereof. In some embodiments, the method 500 and/or the search term construction 504 may comprise identifying (e.g., by the electronic processing device) a keyword, at 504*c*. For any identified parameter, for example, data descriptive of the parameter may be utilized to define, identify, compute, lookup, and/or otherwise determine at least one corresponding keyword. In the case that the parameter comprises a mathematical variable, for example, a keyword may be derived from a name (e.g., tag and/or metadata), title, or heading of the variable and/or based on a mathematical context of the variable (e.g., a numerator, denominator, divisor, exponent, etc.).

In some embodiments, the method 500 and/or the search term construction 504 may comprise determining (e.g., by the electronic processing device) whether the identified keyword matches any previously identified keywords, at 504*d*. In the case that the identified keyword does not match a previously identified keyword, the method 500 and/or the search term construction 504 may proceed to and/or comprise storing the keyword, at 504*e*. In the case that the identified keyword does match a previously identified keyword, and/or after the storing at 504*e*, the method 500 and/or the search term construction 504 may proceed to and/or comprise determining (e.g., by the electronic processing device) whether there are more parameters to evaluate, at 504*f*. The data rows associated with the identified consolidated rule may, for example, be consulted to determine whether any associated criterion, threshold, and/or condition and/or parameters thereof exist that have not yet been analyzed (e.g., by utilization of a programmatic pointer and/or counter). In the case that at least one additional parameter remains, the method 500 and/or the search term construction 504 may proceed back to identifying additional parameters at 504*b*. In the case that all parameters have been evaluated, the method 500 and/or the search term construction 504 may proceed to and/or comprise determining (e.g., by the electronic processing device) whether there are more consolidated rules remaining to be evaluated, at 504*g*. The consolidated rule set may, for example, be consulted to determine whether any associated rules exist that have not yet been analyzed (e.g., by utilization of a programmatic pointer and/or counter). In the case that at least one additional rule remains, the method 500 and/or the search term construction 504 may proceed back to identifying additional rules from the consolidated raw rule set at 504*a*. In the case that all consolidated rules have been evaluated, the method 500 and/or the search term construction 504 may proceed to and/or comprise (i) ending, at 504*h* or (ii) proceeding to "A".

According to some embodiments, and with reference to FIG. 5B, the method 500 may proceed from and/or initiate (e.g., in any case where the rule consolidation 502 and the search term construction 504 are not performed) at "A" and comprise receiving (e.g., by the electronic processing device and/or from a mobile application of a mobile electronic device of a consumer/user) input, at 506. A consumer (e.g., a customer or potential customer) or other user may utilize a mobile electronic device, for example, to input a login/user name or ID (e.g., an account identifier, consumer identifier, organization identifier, etc.), password, passphrase, biometric identifier, multi-factor authentication code, JSON values, text data, images, and/or files (e.g., PDF, image, spreadsheet, and/or other file types). In some embodiments, the input may be encoded, encrypted, and/or compressed and/or may comprise decryption and/or decompression keys, data, hashes, etc. In some embodiments, the input may comprise data descriptive of the consumer/customer and/or one or more business, locations (e.g. real estate, building), and/or assets thereof, such as Personal Identifiable Information (PII), object ownership data, object characteristic data (e.g., year built, model year, miles driven, construction type, location, etc.), consumer preference data, and/or data permissions and/or security information (e.g., a listing of identifiers indicative of one or more other parties that are granted permission to access and/or edit the consumer's data). In some embodiments, the input may comprise elements of an application, such as an application for a quote, purchase, and/or claim for an underwriting product. The application may comprise, for example, one or more GUI and/or form-entered (e.g., API-entered) data values and/or one or more attached (e.g., uploaded and/or referenced) files.

In some embodiments, the method 500 may proceed to and/or comprise converting (e.g., by the electronic processing device and/or utilizing a data conversion algorithm, such as an OCR algorithm) the input, at 508. The received input (or a portion thereof) may be processed through one or more data filter, transformation, and/or conversion and/or interpretation routines, for example, to generate and/or define a searchable version of the input (or a portion thereof). In some embodiments, the searchable version may comprise a text file. According to some embodiments, the method 500 may proceed to and/or comprise searching (e.g., by the electronic processing device and/or utilizing one or more keywords) the input, at 510. At least one portion of the input and/or the converted input may, for example, be searched, queried, and/or analyzed based on one or more predefined search terms, such as one or more of the keywords identified by the search term construction 504. In some embodiments, the method 500 may proceed to and/or comprise determining (e.g., by the electronic processing device) whether a keyword has been found, at 512. One or more search algorithms may be utilized, for example, to search a converted input text file for a particular keyword and return a result of the search. While not depicted in FIG. 5B, the searching at 510 and/or the determining at 512 may comprise a loop that iterates the search for each keyword or other search parameter that is known (e.g., pre-defined and/or stored).

In the case that one or more keywords are found, the method 500 may proceed to and/or comprise determining (e.g., by the electronic processing device) whether a value is found, at 514. Keywords and other search terms may be indicative of a mathematical and/or logical parameter, for example, and the identification of a keyword (and/or other search term) in the input (e.g., in a converted input text file) may accordingly be indicative of a presence of the parameter within the input. At 514, the presence of the parameter may be investigated by searching and/or analyzing a data location and/or position within the input that corresponds to where the search resulted in a "hit". The identified location may be examined, for example, to determine whether a data value (e.g., a numeric value) exists or is missing. In the case that a data value is identified (e.g., at the data location identified by the search) the method 500 may proceed to and/or comprise recording (e.g., by the electronic processing device) that the value exists, at 516. In the case that a data value is not identified (e.g., at the data location identified by the search) the method 500 may proceed to and/or comprise recording (e.g., by the electronic processing device) that the value is missing, at 518. While not depicted in FIG. 5B, the determining at 514 may comprise a loop that iterates the value search for each parameter. In some embodiments, the presence (or lack thereof) of values may be determined and/or identified without extracting the values from the input (e.g., which requires larger amounts of processing and data storage).

According to some embodiments, in any or all of the cases where (i) no keyword is found at 512 (or determining whether keywords are found otherwise ends), (ii) it has been recorded at 516 that a value exists in the input, and/or (iii) it has been recorded at 518 that a value is missing from the input (and/or the determining of whether values are found otherwise ends), the method 500 may proceed to and/or comprise categorizing the input (e.g., threshold evaluation), at 520. The input may be categorized into one or a plurality of predefined categories, for example, based on whether values for searched parameters are known (with or without the input), calculated and/or calculatable, or missing. According to some embodiments, an array or matrix of parameter value availability determinations or metrics may define a particular data availability category or "signature" for each item of input and/or each application submission (e.g., a set of inputs).

In some embodiments, the method 500 may proceed to and/or comprise selecting (e.g., by the electronic processing device) a signature analysis routine, at 522. The selecting may comprise, for example, utilization of a predefined mapping of each parameter value availability category to one of a plurality of signature analysis routines. Each signature analysis routine may comprise coded instructions that define how the input should be processed, e.g., based upon the identified availability of required classification parameter values in the input. In some embodiments, the method 500 may proceed to and/or comprise executing the selected signature analysis routine, at 530. According to some embodiments, the method 500 and/or the executing of the signature analysis routine 530 may comprise identifying (e.g., by the electronic processing device) a rule, at 530*a*. The selected signature analysis routine may comprise and/or define a plurality of rules, for example, and the rules may be selected and/or identified one at a time or in groups (e.g., for parallel processing), as desired. According to some embodiments, once a rule is identified at 530*a* the method 500 and/or the executing of the signature analysis routine 530 may proceed to and/or comprise identifying a parameter, at 530*b*. Each rule defined by the selected signature analysis routine may utilize at least one parameter to calculate and/or compute a result, for example, and such parameters may be selected and/or identified one at a time or in groups (e.g., for parallel processing), as desired.

In some embodiments, once a parameter is identified the method 500 and/or the executing of the signature analysis routine 530 may proceed to and/or comprise extracting a parameter value, at 530*c*. The input and/or the converted input may be queried and/or analyzed, for example, to extract data indicative of the value for the parameter from the input. As described herein, as data extraction may often require the utilization of excessive amounts of processing power and/or memory storage, having the method 500 wait until the signature analysis stage (e.g., the executing of the signature analysis routine 530) may permit the taxing extraction activities to be conducted only for input that has already passed through all previous steps and/or filters, thus reducing the amount of processing and/or memory required (e.g., as all input is not likely to warrant proceeding to the executing of the signature analysis routine 530). In some embodiments, after the value is extracted, the method 500 and/or the executing of the signature analysis routine 530 may proceed to and/or comprise determining (e.g., by the electronic processing device) whether there are additional parameters to evaluate, at 530*d*. Data defining with the identified rule may, for example, be consulted to determine whether any associated parameters thereof exist that have not yet been the subject of data extraction (e.g., for which no value has yet been loaded and/or defined). In the case that at least one additional parameter remains, the method 500 and/or the executing of the signature analysis routine 530 may proceed back to identifying additional parameters at 530*b*. In the case that all parameters have values that have been extracted from the input (and/or otherwise been defined), the method 500 and/or the executing of the signature analysis routine 530 may proceed to and/or comprise evaluating the rule, at 530*e*. Once all data values (e.g., all parameter values and/or other necessary data values) have been extracted, identified, and/or defined, for example, any given rule of the signature analysis routine may be executed, e.g., to define a result of the rule.

According to some embodiments, once the result for the rule has been obtained (e.g., calculated and/or computed at 530*e*), the method 500 and/or the executing of the signature analysis routine 530 may proceed to and/or comprise determining (e.g., by the electronic processing device) whether there are more signature analysis rules remaining to be evaluated, at 530*f*. The selected signature analysis routine may, for example, be consulted to determine whether any associated rules exist that have not yet been analyzed/evaluated (e.g., by utilization of a programmatic pointer and/or counter). In the case that at least one additional rule remains, the method 500 and/or the executing of the signature analysis routine 530 may proceed back to identifying additional rules at 530*a*. In the case that all rules have been evaluated, the method 500 and/or the executing of the signature analysis routine 530 may proceed to and/or comprise computing (e.g., by the electronic processing device) a classification, at 530*g*. The results of any or all evaluated rules may be utilized, for example, to execute a classification routine or logic that results in the selection of at least one available classification to which the input (and/or application) is assigned. In the non-limiting case of an application for an underwriting product, for example, the application may be automatically classified into a particular business or product category. In the case that large numbers of applications/input are received and processed by the method 500, the method 500 may efficiently and accurately classify the incoming input/applications, thereby saving personnel costs (e.g., fewer classification or intake personnel required), time, and resources (e.g., more efficient utilization of computer system resources to achieve the classification and/or less wasted resources due to improper classification results).

In some embodiments, the method 500 and/or the executing of the signature analysis routine 530 may proceed to and/or comprise outputting (e.g., by the electronic processing device and/or via an electronic communications network) the classification, at 532. The classification may be output by transmitting a signal descriptive of the classification (e.g., including data indicative of the classification) to one or more remote, mobile, and/or user devices, for example. According to some embodiments, the classification may be output by routing the application (and/or associated input) to a predefined network location assigned to the computed classification, such as a server and/or computer for a particular business unit. In some embodiments, the classification may be output via a display device, stored in a database in association with the application/input, and/or e-mailed, texted, and/or otherwise transmitted to one or more users.

IV. Pattern-Based Multi-Stage Deterministic Data Classification Apparatus, Articles of Manufacture, & Algorithms Turning to FIG. 6, a block diagram of an apparatus 610 according to some embodiments is shown. In some embodiments, the apparatus 610 may be similar in configuration and/or functionality to one or more of the user devices 102*a-n*, the third-party device 106, and/or the controller device 110 of FIG. 1 herein. The apparatus 610 may, for example, execute, process, facilitate, and/or otherwise be associated with the methods/algorithms 400, 500, 800 of FIG. 4, FIG. 5A, FIG. 5B, and/or FIG. 8 herein, and/or portions or combinations thereof. In some embodiments, the apparatus 610 may comprise a processing device 612, a communication device 614, an input device 616, an output device 618, an interface 620, a memory device 640 (storing various programs and/or instructions 642 and data 644), and/or a cooling device 650. According to some embodiments, any or all of the components 612, 614, 616, 618, 620, 640, 642, 644, 650 of the apparatus 610 may be similar in configuration and/or functionality to any similarly named and/or numbered components described herein. Fewer or more components 612, 614, 616, 618, 620, 640, 642, 644, 650 and/or various configurations of the components 612, 614, 616, 618, 620, 640, 642, 644, 650 may be included in the apparatus 610 without deviating from the scope of embodiments described herein.

According to some embodiments, the processor 612 may be or include any type, quantity, and/or configuration of processor that is or becomes known. The processor 612 may comprise, for example, an Intel® IXP 2800 network processor or an Intel® XEON™ Processor coupled with an Intel® E7501 chipset. In some embodiments, the processor 612 may comprise multiple interconnected processors, microprocessors, and/or micro-engines. According to some embodiments, the processor 612 (and/or the apparatus 610 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 610 comprises a server, such as a blade server, necessary power may be supplied via a standard AC outlet, power strip, surge protector, and/or Uninterruptible Power Supply (UPS) device.

In some embodiments, the communication device 614 may comprise any type or configuration of communication device that is or becomes known or practicable. The communication device 614 may, for example, comprise a Network Interface Card (NIC), a telephonic device, a cellular network device, a router, a hub, a modem, and/or a communications port or cable. In some embodiments, the communication device 614 may be coupled to receive unstructured application input data, e.g., from a consumer device (not shown in FIG. 6). The communication device 614 may, for example, comprise a Bluetooth® Low Energy (BLE) and/or RF receiver device and/or a camera or other imaging device that acquires data from a user (not separately depicted in FIG. 6) and/or a transmitter device that provides the data to a remote server and/or server or communications layer (also not separately shown in FIG. 6). According to some embodiments, the communication device 614 may also or alternatively be coupled to the processor 612. In some embodiments, the communication device 614 may comprise an infrared (IR), RF, Bluetooth™, Near-Field Communication (NFC), and/or Wi-Fi® network device coupled to facilitate communications between the processor 612 and another device (such as a remote user device, not separately shown in FIG. 6).

In some embodiments, the input device 616 and/or the output device 618 are communicatively coupled to the processor 612 (e.g., via wired and/or wireless connections and/or pathways) and they may generally comprise any types or configurations of input and output components and/or devices that are or become known, respectively. The input device 616 may comprise, for example, a keyboard that allows an operator of the apparatus 610 to interface with the apparatus 610 (e.g., by a consumer, to define an underwriting product application, as described herein). In some embodiments, the input device 616 may comprise a sensor, such as a camera, sound, light, and/or proximity sensor, configured to measure parameter values and report measured values via signals to the apparatus 610 and/or the processor 612. The output device 618 may, according to some embodiments, comprise a display screen and/or other practicable output component and/or device. The output device 618 may, for example, provide an interface (such as the interface 620) via which functionality for pattern-based multi-stage deterministic data classification is provided to a user (e.g., via a website and/or mobile application). According to some embodiments, the input device 616 and/or the output device 618 may comprise and/or be embodied in a single device, such as a touch-screen monitor.

The memory device 640 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of rule consolidation instructions 642-1, keyword instructions 642-2, threshold instructions 642-3, signature analysis instructions 642-4, interface instructions 642-5, input data 644-1, rules data 644-2, and/or classification data 644-3. In some embodiments, the rule consolidation instructions 642-1, keyword instructions 642-2, threshold instructions 642-3, signature analysis instructions 642-4, interface instructions 642-5, input data 644-1, rules data 644-2, and/or classification data 644-3 may be utilized by the processor 612 to provide output information via the output device 618 and/or the communication device 614.

According to some embodiments, the rule consolidation instructions 642-1 may be operable to cause the processor 612 to process the input data 644-1, rules data 644-2, and/or classification data 644-3 in accordance with embodiments as described herein. Input data 644-1, rules data 644-2, and/or classification data 644-3 received via the input device 616 and/or the communication device 614 may, for example, be analyzed, sorted, filtered, decoded, decompressed, ranked, scored, plotted, and/or otherwise processed by the processor 612 in accordance with the rule consolidation instructions 642-1. In some embodiments, input data 644-1, rules data 644-2, and/or classification data 644-3 may be fed by the processor 612 through one or more mathematical and/or statistical formulas and/or models in accordance with the rule consolidation instructions 642-1 to merge and/or consolidate rules with similar and/or overlapping criteria, as described herein.

In some embodiments, the keyword instructions 642-2 may be operable to cause the processor 612 to process the input data 644-1, rules data 644-2, and/or classification data 644-3 in accordance with embodiments as described herein. Input data 644-1, rules data 644-2, and/or classification data 644-3 received via the input device 616 and/or the communication device 614 may, for example, be analyzed, sorted, filtered, decoded, decompressed, ranked, scored, plotted, and/or otherwise processed by the processor 612 in accordance with the keyword instructions 642-2. In some embodiments, input data 644-1, rules data 644-2, and/or classification data 644-3 may be fed by the processor 612 through one or more mathematical and/or statistical formulas and/or models in accordance with the keyword instructions 642-2 to define keywords and/or other search terms and/or data based on desired parameters and/or parameter value sets, as described herein.

According to some embodiments, the threshold instructions 642-3 may be operable to cause the processor 612 to process the input data 644-1, rules data 644-2, and/or classification data 644-3 in accordance with embodiments as described herein. Input data 644-1, rules data 644-2, and/or classification data 644-3 received via the input device 616 and/or the communication device 614 may, for example, be analyzed, sorted, filtered, decoded, decompressed, ranked, scored, plotted, and/or otherwise processed by the processor 612 in accordance with the threshold instructions 642-3. In some embodiments, input data 644-1, rules data 644-2, and/or classification data 644-3 may be fed by the processor 612 through one or more mathematical and/or statistical formulas and/or models in accordance with the threshold instructions 642-3 to identify parameters and/or parameter availability scenarios, as described herein.

In some embodiments, the signature analysis instructions 642-4 may be operable to cause the processor 612 to process the input data 644-1, rules data 644-2, and/or classification data 644-3 in accordance with embodiments as described herein. Input data 644-1, rules data 644-2, and/or classification data 644-3 received via the input device 616 and/or the communication device 614 may, for example, be analyzed, sorted, filtered, decoded, decompressed, ranked, scored, plotted, and/or otherwise processed by the processor 612 in accordance with the signature analysis instructions 642-4. In some embodiments, input data 644-1, rules data 644-2, and/or classification data 644-3 may be fed by the processor 612 through one or more mathematical and/or statistical formulas and/or models in accordance with the signature analysis instructions 642-4 to identify and/or select one or more signature rules corresponding to the identified parameter availability scenarios, as described herein.

According to some embodiments, the interface instructions 642-5 may be operable to cause the processor 612 to process the input data 644-1, rules data 644-2, and/or classification data 644-3 in accordance with embodiments as described herein. Input data 644-1, rules data 644-2, and/or classification data 644-3 received via the input device 616 and/or the communication device 614 may, for example, be analyzed, sorted, filtered, decoded, decompressed, ranked, scored, plotted, and/or otherwise processed by the processor 612 in accordance with the signature analysis instructions 642-4. In some embodiments, input data 644-1, rules data 644-2, and/or classification data 644-3 may be fed by the processor 612 through one or more mathematical and/or statistical formulas and/or models in accordance with the interface instructions 642-5 to provide various interfaces to consumers, companies, and/or other users to facilitate entry of application data, login credentials, external application data, etc., as described herein.

According to some embodiments, the apparatus 610 may comprise the cooling device 650. According to some embodiments, the cooling device 650 may be coupled (physically, thermally, and/or electrically) to the processor 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 610.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

Referring to FIG. 7A, FIG. 7B, FIG. 7C, FIG. 7D, and FIG. 7E, perspective diagrams of exemplary data storage devices 740a-e according to some embodiments are shown. The data storage devices 740a-e may, for example, be utilized to store instructions and/or data, such as the rule consolidation instructions 642-1, keyword instructions 642-2, threshold instructions 642-3, signature analysis instructions 642-4, interface instructions 642-5, input data 644-1, rules data 644-2, and/or classification data 644-3, each of which is presented in reference to FIG. 6 herein. In some embodiments, instructions stored on the data storage devices 740a-e may, when executed by a processor, cause the implementation of and/or facilitate the methods/algorithms 400, 500, 800 of FIG. 4, FIG. 5A, FIG. 5B, and/or FIG. 8 herein, and/or portions or combinations thereof.

According to some embodiments, the first data storage device 740a may comprise one or more various types of internal and/or external hard drives. The first data storage device 740a may, for example, comprise a data storage medium 746 that is read, interrogated, and/or otherwise communicatively coupled to and/or via a disk reading device 748. In some embodiments, the first data storage device 740a and/or the data storage medium 746 may be configured to store information utilizing one or more magnetic, inductive, and/or optical means (e.g., magnetic, inductive, and/or optical-encoding). The data storage medium 746, depicted as a first data storage medium 746a for example (e.g., breakout cross-section "A"), may comprise one or more of a polymer layer 746a-1, a magnetic data storage layer 746a-2, a non-magnetic layer 746a-3, a magnetic base layer 746a-4, a contact layer 746a-5, and/or a substrate layer 746a-6. According to some embodiments, a magnetic read head 748a may be coupled and/or disposed to read data from the magnetic data storage layer 746a-2.

In some embodiments, the data storage medium 746, depicted as a second data storage medium 746b for example (e.g., breakout cross-section "B"), may comprise a plurality of data points 746b-2 disposed with the second data storage medium 746b. The data points 746b-2 may, in some embodiments, be read and/or otherwise interfaced with via a laser-enabled read head 748b disposed and/or coupled to direct a laser beam through the second data storage medium 746b.

In some embodiments, the second data storage device 740b may comprise a CD, CD-ROM, DVD, Blu-Ray™ Disc, and/or other type of optically-encoded disk and/or other storage medium that is or becomes know or practicable. In some embodiments, the third data storage device 740c may comprise a USB keyfob, dongle, and/or other type of flash memory data storage device that is or becomes know or practicable. In some embodiments, the fourth data storage device 740d may comprise RAM of any type, quantity, and/or configuration that is or becomes practicable and/or desirable. In some embodiments, the fourth data storage device 740d may comprise an off-chip cache such as a Level 2 (L2) cache memory device. According to some embodiments, the fifth data storage device 740e may comprise an on-chip memory device such as a Level 1 (L1) cache memory device.

The data storage devices 740a-e depicted in FIG. 7A, FIG. 7B, FIG. 7C, FIG. 7D, and FIG. 7E are representative of a class and/or subset of computer-readable media that are defined herein as "computer-readable memory" (e.g., non-transitory memory devices as opposed to transmission devices or media). The data storage devices 740a-e may generally store program instructions, algorithms, software engines, code, and/or modules that, when executed by a processing device cause a particular machine to function in accordance with one or more embodiments described herein.

Figure 8:
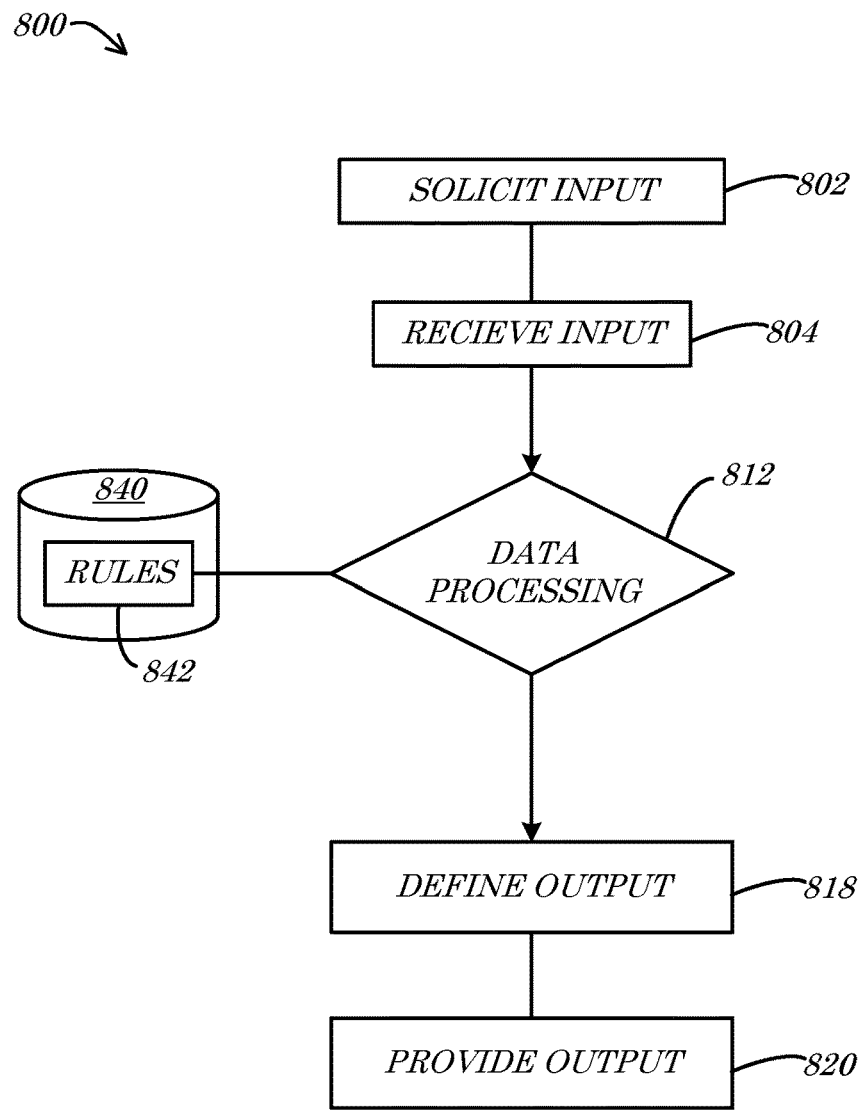
FIG. 8 is flowchart of an algorithm according to some embodiments.

With reference to FIG. 8, for example, the data storage devices 740a-e may store and/or define an algorithm 800. The algorithm 800 may comprise, for example, one or more software programs, modules, engines, and/or applications coded to perform any of the methods 400, 500 of FIG. 4, FIG. 5A, and/or FIG. 5B herein, and/or portions or combinations thereof. The algorithm 800, and any reference to the term "algorithm" herein, refers to any set of defined instructions that operate upon input to define and/or provide output. The algorithm 800 may, for example, be specifically programmed and/or otherwise defined to instruct a computer or other device (not shown) to solve a particular problem (e.g., logical) and/or resolve a particular mathematical calculation (e.g., arithmetic). In some embodiments, the algorithm 800 may be written and/or defined as a series or sequence of instructions encoded in (e.g., written in accordance with syntax and/or semantics rules) a particular computer programming language (e.g., Python™, Java™, JavaScript™, C, C++, C #, Basic™, FORTRAN, COBOL, Ruby™, and/or Perl™), e.g., a set of instructions that convert and/or encode characters, objects, and/or other data elements into machine code (e.g., code operable to be executed by an electronic processing device such as a CPU).

According to some embodiments, the algorithm 800 may comprise soliciting input, at 802. Input from one or more sources may be searched for and/or queried, by structuring and/or executing a database query and/or by sending a data communication signal or "handshake", such as is common with Bluetooth® short-range communication protocols. In some embodiments, the algorithm 800 may comprise receiving the input, at 804. Whether solicited or otherwise provided and/or acquired (e.g. loaded and/or downloaded), for example, the input for the algorithm 800 may be received, identified, and/or otherwise processed and/or located. According to some embodiments, the algorithm 800 may comprise data processing, at 812. The data processing 812 may, for example, comprise execution of one or more logical and/or computational procedures, modules, scripts, and/or routines that may be stored in a memory device 840 (e.g., similar to the data storage devices 740*a-e*) as a set of instructions or rules 842 and/or that may defined and/or implemented by one or more electrical, mechanical, and/or physical components, such as logic gates, diodes, transistors, relays, and/or switches (e.g., operable to execute any of the methods 400, 500 of FIG. 4, FIG. 5A, and/or FIG. 5B herein, and/or portions or combinations thereof).

In some embodiments, execution of the algorithm 800 may comprise a loading of the rules 842 into the memory 840 and/or into an electronic processing system (not shown) and/or an activation of one or more logic gates and/or other electrical and/or mechanical components. The algorithm 800 may operate upon the input in accordance with the rules 842 to achieve a result by defining output, at 818. The algorithm 800 may, for example, generate, produce, define, identify, calculate, and/or otherwise compute output based on an application of the data processing 812 utilizing the rules 842 and any or all input receiving at 804. According to some embodiments, the algorithm 800 may comprise providing the output, at 820. One or more output devices (not shown) may be utilized to convey the output (e.g., a result, conclusion, decision, etc.) to one or more other devices and/or entities (not shown), such as one or more users, consumers, customers, potential customers, and/or devices utilized thereby. The output may be displayed via an electronic display screen of a computer, mobile/smart phone, smart watch, etc., and/or may be transmitted as one or more electronic signals to one or more network destination addresses, such as e-mail addresses, URL locations, MAC addresses, and/or broadcast radio frequencies.

According to some embodiments, the data processing at 812 may comprise execution of a listing, sequence, matrix, and/or other set of stored steps and/or instructions that utilize the input to define the output. In some embodiments, the listing of steps and/or instruction details may comprise elements that are known to those skilled in the art. The algorithm 800 may partially or completely comprise, for example, instructions and/or steps that are well known, such as steps and/or instructions operable to calculate an area (length times width), volume (length times width times height), distance (difference between two locations), velocity (distance over time), acceleration (velocity over time), and/or any other known mathematical and/or logical (if/then statements) procedures. For any and all known procedures and/or instructions, the discrete details of such instructions are represented by the data processing at 812 and are not listed herein as one of ordinary skill in the art would readily comprehend both what such technological knowledge entails and that the inventor has possession of such knowledge. Instructions that may be included within and/or comprise the data processing at 812 (and/or the algorithm 800) may include, for example, but are not limited to, any known or practicable: (i) OCR algorithms, (ii) GUI object behavior algorithms, (iii) data transmission algorithms, (iv) data encoding algorithms, (v) data decoding algorithms, (vii) logical and/or mathematical data comparison algorithms, and (viii) data searching (e.g., keyword searching) algorithms.

V. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Neither the Title (set forth at the beginning of the first page of this patent application) nor the Abstract (set forth at the end of this patent application) is to be taken as limiting in any way as the scope of the disclosed invention(s). Headings of sections provided in this patent application are for convenience only, and are not to be taken as limiting the disclosure in any way.

All definitions, as defined and used herein, should be understood to control over dictionary definitions, definitions in documents incorporated by reference, and/or ordinary meanings of the defined terms. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The indefinite articles "a" and "an," as used herein in the specification and in the claims, unless clearly indicated to the contrary, should be understood to mean "at least one" or "one or more".

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

As utilized herein, the terms "program" or "computer program" may refer to one or more algorithms formatted for execution by a computer. The term "module" or "software module" refers to any number of algorithms and/or programs that are written to achieve a particular output and/or output goal—e.g., a 'login credentialing' module (or program) may provide functionality for permitting a user to login to a computer software and/or hardware resource and/or a 'shipping' module (or program) may be programmed to electronically initiate a shipment of an object via a known and/or available shipping company and/or service (e.g., FedEX®). The terms "engine" or "software engine" refer to any combination of software modules and/or algorithms that operate upon one or more inputs to define one or more outputs in an ongoing, cyclical, repetitive, and/or loop fashion. Data transformation scripts and/or algorithms that query data from a data source, transform the data, and load the transformed data into a target data repository may be termed 'data transformation engines', for example, as they repetitively operate in an iterative manner upon each row of data to produce the desired results.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A method for pattern-based multi-stage deterministic data classification, comprising:
 receiving, by at least one electronic processing device from a plurality of electronic processing devices of a server, an application for an underwriting product, the application comprising at least one data value and at least one attached file;
 converting, utilizing an Optical Character Recognition (OCR) algorithm stored in a non-transitory data storage device that is in communication with the at least one electronic processing device, at least one portion of the at least one attached file into at least one searchable text character, thereby defining a searchable version of the at least one attached file;
 searching, by the at least one electronic processing device and utilizing a listing of keywords stored in the non-transitory data storage device, the listing of keywords representing required data elements for a consolidated set of strategic classification rules, the searchable version of the at least one attached file;
 identifying, by the at least one electronic processing device and based on the searching, and for each required data element for the consolidated set of strategic classification rules, whether a value for the required data element exists in the at least one attached file;
 categorizing, by the at least one electronic processing device and based on the identifying of whether the values for the required data elements exist in the at least one attached file, the application into one of a plurality of pre-defined data availability categories;
 selecting, by the at least one electronic processing device and based on the categorized one of the plurality of pre-defined data availability categories for the application and utilizing a mapping stored in the non-transitory data storage device, the mapping comprising a mapping of the plurality of data availability categories to a plurality of signature analysis routines, one of the plurality of signature analysis routines;
 identifying, by the at least one electronic processing device and by an execution of the selected one of the plurality of signature analysis routines, values for the required data elements for the consolidated set of strategic classification rules;
 evaluating, by the at least one electronic processing device and based on the identified values for the required data elements for the consolidated set of strategic classification rules, the consolidated set of strategic classification rules;
 identifying, by the at least one electronic processing device and based on the evaluating, a numeric value for a classification; and
 automatically routing, by the at least one electronic processing device, the application for the underwriting product to an address assigned to the identified classification.

2. The method of claim 1, further comprising:
 conducting a pattern-based multi-stage deterministic strategic classification rule consolidation, comprising:
  identifying a set of strategic classification rules, the set of strategic classification rules comprising a plurality of data rows;
  identifying, for each data row of the plurality of data rows of the set of strategic classification rules, at least one assigned condition;
  identifying a plurality of commonalities between assigned conditions for different data rows of the set of strategic classification rules; and
  grouping, based on the identified commonalities, at least two different data rows of the set of strategic classification rules, thereby defining the consolidated set of strategic classification rules.

3. The method of claim 2, wherein the identifying of the set of strategic classification rules comprises:
 receiving a spreadsheet file comprising a plurality of data rows defining the set of strategic classification rules.

4. The method of claim 3, wherein the set of strategic classification rules comprises a plurality of numeric threshold definitions.

5. The method of claim 3, wherein the plurality of data rows comprises a number of rows greater than one thousand.

6. The method of claim 2, wherein the identifying of the set of strategic classification rules comprises:
 querying a database comprising a plurality of data entries storing definitions of the set of strategic classification rules.

7. The method of claim 6, wherein the plurality of data entries comprises a number of entries greater than one thousand.

8. The method of claim 2, wherein the grouping of the at least two different data rows of the set of strategic classification rules comprises at least one of (i) consolidating the at least two different rows of the set of strategic classification rules into a single row defining the consolidated set of strategic classification rules and (ii) merging the at least two different rows of the set of strategic classification rules into the single row defining the consolidated set of strategic classification rules.

9. The method of claim 1, wherein the categorized one of the plurality of pre-defined data availability categories comprises a category wherein one of: (i) the values for all the required data elements are identified to exist in the application, (ii) a subset of the values for all the required data elements are identified to exist in the application, or (iii) no values for the required data elements are identified to exist in the application.

10. The method of claim 1, wherein the categorizing of the application into the one of the plurality of pre-defined data availability categories is further based on the at least one data value of the application.

11. The method of claim 10, wherein the at least one data value comprises a JSON value.

12. The method of claim 1, wherein the categorized one of the plurality of pre-defined data availability categories comprises a category wherein each desired data element for the application: (i) is represented by an identified corresponding keyword in the at least one attached file, (ii) is represented by the at least one data value of the application, or (iii) can be calculated based on one or more data elements from (i) or (ii).

13. The method of claim 1, wherein the categorized one of the plurality of pre-defined data availability categories comprises a category wherein only a subset of all the required data elements are identified to exist in the application.

14. The method of claim 2, wherein the consolidated set of strategic classification rules are defined, based on the grouping, by less than fifty data rows.

15. The method of claim 1, wherein the identifying of the values for the required data elements for the consolidated set of strategic classification rules comprises extracting the values from the at least one attached file of the application.

16. The method of claim 1, wherein the identifying of the values for the required data elements for the consolidated set of strategic classification rules comprises identifying the values from the at least one data value of the application.

17. The method of claim 1, wherein the identifying of the values for the required data elements for the consolidated set of strategic classification rules comprises calculating the values from one or more of (i) the at least one data value of the application and (ii) at least one value extracted from the at least one attached file of the application.

18. A method for pattern-based multi-stage deterministic data classification, comprising:

- receiving, by at least one electronic processing device from a plurality of electronic processing devices of a server, an application for an underwriting product, the application comprising at least one data value and at least one attached file;
- converting, utilizing an Optical Character Recognition (OCR) algorithm stored in a non-transitory data storage device that is in communication with the at least one electronic processing device, at least one portion of the at least one attached file into at least one searchable text character, thereby defining a searchable version of the at least one attached file;
- searching, by the at least one electronic processing device and utilizing a listing of keywords stored in the non-transitory data storage device, the listing of keywords representing required data elements for a consolidated set of strategic classification rules, wherein the consolidated set of strategic classification rules are defined utilizing a pattern-based multi-stage deterministic consolidation process, the searchable version of the at least one attached file;
- identifying, by the at least one electronic processing device and based on the searching, and for each required data element for the consolidated set of strategic classification rules, whether a value for the required data element exists in the at least one attached file;
- categorizing, by the at least one electronic processing device and based on the identifying of whether the values for the required data elements exist in the at least one attached file and based on the at least one data value of the application, the application into one of a plurality of pre-defined data availability categories;
- selecting, by the at least one electronic processing device and based on the categorized one of the plurality of pre-defined data availability categories for the application and utilizing a mapping stored in the non-transitory data storage device, the mapping comprising a mapping of the plurality of data availability categories to a plurality of signature analysis routines, one of the plurality of signature analysis routines;
- identifying, by the at least one electronic processing device and by an execution of the selected one of the plurality of signature analysis routines, values for the required data elements for the consolidated set of strategic classification rules;
- evaluating, by the at least one electronic processing device and based on the identified values for the required data elements for the consolidated set of strategic classification rules, the consolidated set of strategic classification rules;
- identifying, by the at least one electronic processing device and based on the evaluating, a numeric value for a classification; and
- automatically routing, by the at least one electronic processing device, the application for the underwriting product to an address assigned to the identified classification.

19. The method of claim 18, wherein the at least one data value comprises a JSON value.

20. The method of claim 18, wherein the categorized one of the plurality of pre-defined data availability categories comprises a category wherein one of: (i) the values for all the required data elements are identified to exist in the application, (ii) a subset of the values for all the required data elements are identified to exist in the application, or (iii) no values for the required data elements are identified to exist in the application.

* * * * *